US012621895B2

(12) United States Patent
Chen et al.

(10) Patent No.: US 12,621,895 B2
(45) Date of Patent: May 5, 2026

(54) COMMUNICATIONS METHOD AND APPARATUS

(71) Applicant: HUAWEI TECHNOLOGIES CO., LTD., Shenzhen (CN)

(72) Inventors: Yan Chen, Shanghai (CN); Le Jin, Shanghai (CN); Bingguang Peng, Shanghai (CN); Xi Zhang, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 556 days.

(21) Appl. No.: 17/707,514

(22) Filed: Mar. 29, 2022

(65) Prior Publication Data

US 2022/0225180 A1     Jul. 14, 2022

Related U.S. Application Data

(63) Continuation of application No. PCT/CN2019/109734, filed on Sep. 30, 2019.

(51) Int. Cl.
| | |
|---|---|
| *H04W 76/19* | (2018.01) |
| *H04W 36/00* | (2009.01) |
| *H04W 36/18* | (2009.01) |
| *H04W 76/28* | (2018.01) |

(52) U.S. Cl.
CPC ....... *H04W 76/19* (2018.02); *H04W 36/0055* (2013.01); *H04W 36/185* (2023.05); *H04W 76/28* (2018.02)

(58) Field of Classification Search
USPC .......................................................... 370/331
See application file for complete search history.

(56) References Cited

U.S. PATENT DOCUMENTS

| | | | |
|---|---|---|---|
| 11,419,051 B1 * | 8/2022 | Nath ..................... | H04W 76/28 |
| 2008/0090573 A1 * | 4/2008 | Kim .................. | H04W 52/0216 |
| | | | 455/436 |
| 2008/0232310 A1 * | 9/2008 | Xu .................... | H04W 52/0216 |
| | | | 370/329 |

(Continued)

FOREIGN PATENT DOCUMENTS

| | | |
|---|---|---|
| CN | 101352093 A | 1/2009 |
| CN | 105684516 A | 6/2016 |

OTHER PUBLICATIONS

Nokia Corporation, Nokia Siemens Networks, "HetNet Mobility and DRX with Keep Alive Traffic," 3GPP TSG-RAN WG2 Meeting #77bis, R2-121163, Jeju, South Korea, Mar. 26-30, 2012, 10 pages.

(Continued)

*Primary Examiner* — Gregory B Sefcheck
*Assistant Examiner* — Majid Esmaeilian
(74) *Attorney, Agent, or Firm* — Fish & Richardson P.C.

(57) ABSTRACT

The disclosure provides communication methods and apparatuses. One example method includes that after receiving a cell handover command, a terminal device determines discontinuous reception (DRX) configuration information of a target cell. The DRX configuration information of the target cell is consistent with DRX configuration information of a source cell. The terminal device exchanges data at least with the source cell based on the DRX configuration information of the source cell, or with the target cell based on the DRX configuration information of the target cell.

12 Claims, 12 Drawing Sheets

(56) References Cited

U.S. PATENT DOCUMENTS

| | | | | |
|---|---|---|---|---|
| 2011/0243047 A1* | 10/2011 | Dayal | .................... | H04W 16/14 |
| | | | | 370/329 |
| 2011/0256834 A1* | 10/2011 | Dayal | .............. | H04W 72/1215 |
| | | | | 455/67.7 |
| 2013/0084910 A1* | 4/2013 | Suzuki | .................. | H04W 24/02 |
| | | | | 455/67.11 |
| 2013/0194994 A1* | 8/2013 | Dayal | .................... | H04L 1/1887 |
| | | | | 370/311 |
| 2016/0105927 A1* | 4/2016 | Lee | ........................ | H04W 76/28 |
| | | | | 370/332 |
| 2017/0019820 A1* | 1/2017 | Das | ........................ | H04W 76/28 |
| 2017/0374617 A1* | 12/2017 | Futaki | .................. | H04W 36/165 |
| 2018/0213452 A1 | 7/2018 | Kim et al. | | |
| 2018/0343686 A1 | 11/2018 | Manepalli et al. | | |
| 2021/0105673 A1* | 4/2021 | Jassal | .................. | H04W 36/185 |
| 2022/0124530 A1* | 4/2022 | Takahashi | ......... | H04W 52/0219 |
| 2022/0174780 A1* | 6/2022 | Bao | .................. | H04W 52/0248 |
| 2022/0346180 A1* | 10/2022 | Tseng | .................... | H04W 76/14 |
| 2023/0061163 A1* | 3/2023 | Mochizuki | ........... | H04W 76/30 |
| 2023/0062804 A1* | 3/2023 | Selvanesan | ........... | H04W 76/28 |
| 2023/0097437 A1* | 3/2023 | Chung | .................. | H04W 76/16 |
| | | | | 370/328 |
| 2023/0262634 A1* | 8/2023 | Kim | .................. | H04W 56/0045 |
| | | | | 370/350 |

OTHER PUBLICATIONS

Office action issued in Chinese Application No. 201980098032.0 on Oct. 10, 2022, 8 pages.

MediaTek, "IDC Information Forwarding at Handover," 3GPP TSG-RAN2 #77 meeting, R2-120227, Dresden, Germany, Feb. 6-10, 2012, 4 pages.

PCT International Search Report and Written Opinion issued in International Application No. PCT/CN2019/109734 on Jun. 23, 2020, 18 pages (with English translation).

Extended European Search Report issued in European Application No. 19947979.1 on Aug. 8, 2022, 8 pages.

Intel Corporation, "DRX Alignment for Dual Connectivity," 3GPP TSG RAN WG2 Meeting #86, R2-142033, Seoul, South Korea, May 19-23, 2014, 4 pages.

Office Action in Chinese Appln. No. 201980098032.0, dated Apr. 15, 2023, 11 pages.

* cited by examiner

COMMUNICATIONS METHOD AND APPARATUS

CROSS-REFERENCE TO RELATED APPLICATIONS

This application is a continuation of International Application No. PCT/CN2019/109734, filed on Sep. 30, 2019, the disclosure of which is hereby incorporated by reference in its entirety.

TECHNICAL FIELD

This application relates to the field of communications technologies, and in particular, to a communications method and apparatus.

BACKGROUND

Because a concept of a beam is introduced into new radio (NR), a beam scanning delay introduced by a high frequency beamforming technology increases a handover interruption time. In addition, a beamforming feature causes relatively small coverage. Consequently, handover reliability is reduced. When a terminal device moves or rotates, the terminal device may experience extremely fast signal degradation. In addition, a channel condition difference between a line of sight (LoS) and a non-line of sight (NLoS) in the NR is relatively large, and a signal strength difference between the LOS and the NLOS reaches tens of dB. Consequently, more handover failures and a higher ping-pong handover probability may be caused. Therefore, handover in the NR is more challenging than that in a long term evolution (LTE) communications system.

In addition, ultra-reliable low-latency communication (URLLC) services of the NR require an end-to-end latency of 1 ms in some cases. A handover interruption of 0 ms is very important to provide seamless service experience.

A dual-access protocol stack (DAPS) handover solution may implement the handover interruption of 0 ms. FIG. 1 is a schematic diagram of a DAPS handover procedure. A source cell sends a handover command (HO cmd) to a terminal device, the terminal device initiates access to a target cell, and then the terminal device completes the access to the target cell. In this solution, after the terminal device initiates access, the terminal device continues to communicate with the source cell; and after the terminal device completes the access, the terminal device establishes a connection to the target cell. A scenario in which a terminal device simultaneously communicates with two cells is a dual-cell connection ("dual connection" for short) interval shown in FIG. 1. Finally, after the target cell initiates signaling for deleting the source cell, the terminal device communicates with only the target cell to complete handover. In the handover process, the terminal device simultaneously communicates with the source cell and the target cell, to implement a handover interruption of 0 ms.

In an intra-frequency (intra-freq) synchronous/asynchronous scenario and an intra-band continuous synchronous/asynchronous scenario, FIG. 2 shows a structure of radio frequency transceiving and processing of a terminal device. A baseband processing (BBP) module of a source cell and a BBP module of a target cell of the terminal device are connected to a same radio frequency (RF) module, in other words, a BBP channel of the source cell and a BBP channel of the target cell are connected to a same RF channel. This can reduce power consumption of the terminal device.

To further reduce the power consumption of the terminal device, a discontinuous reception (DRX) technology is introduced. In a web browsing scenario, a voice over long term evolution (VOLTE) call scenario, or the like, a modem of the terminal device is in a burst working state, and a proportion of a working time to a total time is relatively small, so that working and power saving can be implemented by using a burst transceiving mechanism. To reduce the power consumption of the terminal device, a network device sends a DRX configuration parameter to the terminal device.

In the DAPS handover solution, especially in the foregoing intra-freq and intra-band continuous scenarios, how the source cell and the target cell configure DRX for the terminal device to reduce the power consumption of the terminal device is a problem that needs to be resolved in this application.

SUMMARY

Embodiments of this application provide a communications method and apparatus, to reduce power consumption of a terminal device.

According to a first aspect, a communications method is provided. The method includes: After a terminal device receives a cell handover command, when the terminal device is connected to both a source cell and a target cell, the terminal device determines a discontinuous reception DRX configuration information for the source cell and the target cell. The DRX configuration solution includes any one of the following: DRX configuration information of the source cell and DRX configuration information of the target cell are independently configured; the DRX configuration information of the source cell is consistent with the DRX configuration information of the target cell; neither the DRX configuration information of the source cell nor the DRX configuration information of the target cell is configured or is valid; or the DRX configuration information of the source cell remains unchanged and the DRX configuration information of the target cell is not configured. The terminal device exchanges data with the source cell according to the DRX configuration information for the source cell, and/or communicates with the target cell according to the DRX configuration solution for the target cell.

According to a second aspect, a communications method is provided. The method includes: after a cell handover command is received, determining DRX configuration information of a target cell, where the DRX configuration information of the target cell is consistent with DRX configuration information of a source cell; and exchanging data with the source cell based on the DRX configuration information of the source cell, and/or exchanging data with the target cell based on the DRX configuration information of the target cell.

In an implementation, the method further includes: when a radio link failure occurs in the target cell, determining that the DRX configuration information of the target cell is invalid; and deleting the DRX configuration information of the target cell.

In another implementation, the method further includes: when a radio link failure occurs in the source cell, determining that the DRX configuration information of the source cell is invalid; and initiating access to the target cell or maintaining a connection to the target cell.

In another implementation, determining the DRX configuration information of the source cell includes: determining that the DRX configuration information of the source cell does not include a short DRX cycle parameter; or receiving a reconfiguration message from the source cell, where the reconfiguration message is used to indicate to delete a short DRX cycle parameter in the DRX configuration information of the source cell, and/or reconfigure the short DRX cycle parameter in the DRX configuration information of the source cell, and/or modify a long DRX cycle parameter in the DRX configuration information of the source cell.

According to a third aspect, a communications method is provided. The method includes: determining discontinuous reception DRX configuration information of a target cell, where the DRX configuration information of the target cell is consistent with DRX configuration information of a source cell; and exchanging data with a terminal device based on the DRX configuration information of the target cell.

In an implementation, the determining DRX configuration information of a target cell includes: receiving a handover request from the source cell, where the handover request includes the DRX configuration information of the source cell.

According to a fourth aspect, a communications method is provided. The method includes: determining discontinuous reception DRX configuration information of a source cell; and sending the DRX configuration information of the source cell to a target cell.

In an implementation, the determining DRX configuration information of a source cell includes: determining that the DRX configuration information of the source cell does not include a short DRX cycle parameter; or sending a reconfiguration message to a terminal device, where the reconfiguration message is used to indicate the terminal device to delete a short DRX cycle parameter in the DRX configuration information of the source cell, and/or modify a long DRX cycle parameter in the DRX configuration information of the source cell.

In another implementation, that the DRX configuration information of the target cell is consistent with DRX configuration information of a source cell includes: when the DRX configuration information of the source cell includes the long cycle parameter and the short cycle parameter, a long cycle parameter of the target cell is the same as the long cycle parameter of the source cell, and a short cycle parameter of the target cell is the same as the short cycle parameter of the source cell; or when the DRX configuration information of the source cell includes the short cycle parameter, and the DRX configuration information of the target cell does not include the short cycle parameter, the long cycle parameter of the target cell is the same as the short cycle parameter of the source cell, or the long cycle parameter of the target cell is an integer multiple of the short cycle parameter of the source cell, or the short cycle parameter of the source cell is an integer multiple of the long cycle parameter of the target cell; or when the DRX configuration information of the source cell includes the short cycle parameter, and the DRX configuration information of the target cell includes the short cycle parameter, the short cycle parameter of the target cell is the same as the short cycle parameter of the source cell, or the short cycle parameter of the target cell is an integer multiple of the short cycle parameter of the source cell, or the short cycle parameter of the source cell is an integer multiple of the short cycle parameter of the target cell; or when the DRX configuration information of the source cell includes the long cycle parameter, and the DRX configuration information of the target cell does not include the short cycle parameter, the long cycle parameter of the target cell is the same as the long cycle parameter of the source cell, or the long cycle parameter of the target cell is an integer multiple of the long cycle parameter of the source cell, or the long cycle parameter of the source cell is an integer multiple of the long cycle parameter of the target cell; or when the DRX configuration information of the source cell includes the long cycle parameter, and the DRX configuration information of the target cell includes the short cycle parameter, the short cycle parameter of the target cell is the same as the long cycle parameter of the source cell, or the short cycle parameter of the target cell is an integer multiple of the long cycle parameter of the source cell, or the long cycle parameter of the source cell is an integer multiple of the short cycle parameter of the target cell.

According to a fifth aspect, a communications method is provided. The method includes: after a cell handover command is received, determining that discontinuous reception DRX configuration information of a source cell is invalid, and determining that a target cell does not enable a discontinuous reception DRX function.

In an implementation, the determining that discontinuous reception DRX configuration information of a source cell is invalid includes: receiving a reconfiguration message from the source cell, where the reconfiguration message is used to indicate to delete the discontinuous reception DRX configuration information of the source cell; and deleting the DRX configuration information of the source cell.

According to a sixth aspect, a communications method is provided. The method includes: after a cell handover command is received, determining that discontinuous reception DRX configuration information of a source cell is invalid.

In an implementation, the determining that DRX configuration information of a source cell is invalid includes: after a terminal device hands over to a target cell, receiving a notification message from the target cell, where the notification message is used to notify the source cell that the terminal device has initiated a connection to the target cell. The method further includes: sending a reconfiguration message to the terminal device, where the reconfiguration message is used to indicate to delete the DRX configuration information of the source cell.

According to a seventh aspect, a communications method is provided. The method includes: determining that a target cell does not enable a discontinuous reception DRX function.

According to an eighth aspect, a communications method is provided. The method includes: after a cell handover command is received, communicating with a source cell based on discontinuous reception DRX configuration information of the source cell, and always communicating with a target cell.

In an implementation, the always communicating with a target cell includes: when connections to both the source cell and the target cell are established, skipping enabling DRX configuration information of the target cell.

In another implementation, after the connection to the source cell is deleted, the method further includes: enabling the DRX configuration information of the target cell; or receiving the DRX configuration information of the target cell.

According to a ninth aspect, a communications apparatus is provided. The communications apparatus can implement the communications method according to any one of the first aspect, the second aspect, the fifth aspect, or the eighth aspect and the implementations. For example, the communications apparatus may be a chip (for example, a baseband chip or a communications chip). The foregoing method may be implemented by software, hardware, or hardware executing corresponding software.

In a possible implementation, a structure of the communications apparatus includes a processor and a memory. The processor is configured to support the apparatus in performing a corresponding function in the foregoing communications method. The memory is configured to be coupled to the processor, and the memory stores a program (instructions) and/or data necessary for the apparatus. Optionally, the communications apparatus may further include a communications interface, configured to support communication between the apparatus and another network element.

In another possible implementation, the communications apparatus may include a unit or a module for performing a corresponding function or action in the foregoing method.

In another possible implementation, the communications apparatus includes a processor and a transceiver apparatus. The processor is coupled to the transceiver apparatus, and the processor is configured to execute a computer program or instructions, to control the transceiver apparatus to receive and send information. When the processor executes the computer program or the instructions, the processor is further configured to implement the foregoing method. For example, the transceiver apparatus may be a transceiver, a transceiver circuit, or an input/output interface. When the communications apparatus is a chip, the transceiver apparatus is a transceiver circuit or an input/output interface.

When the communications apparatus is a chip, a sending unit may be an output unit, for example, an output circuit or a communications interface; and a receiving unit may be an input unit, for example, an input circuit or a communications interface. When the communications apparatus is a network device, a sending unit may be a transmitter or a transmit machine, and a receiving unit may be a receiver or a receive machine.

According to a tenth aspect, a communications apparatus is provided. The communications apparatus can implement the communications method according to any one of the third aspect or the seventh aspect and the implementations. For example, the communications apparatus may be a chip (for example, a baseband chip or a communications chip). The foregoing method may be implemented by software, hardware, or hardware executing corresponding software.

In a possible implementation, a structure of the communications apparatus includes a processor and a memory. The processor is configured to support the apparatus in performing a corresponding function in the foregoing communications method. The memory is configured to be coupled to the processor, and the memory stores a program (instructions) and/or data necessary for the apparatus. Optionally, the communications apparatus may further include a communications interface, configured to support communication between the apparatus and another network element.

In another possible implementation, the communications apparatus may include a unit or a module for performing a corresponding action in the foregoing method.

In another possible implementation, the communications apparatus includes a processor and a transceiver apparatus. The processor is coupled to the transceiver apparatus, and the processor is configured to execute a computer program or instructions, to control the transceiver apparatus to receive and send information. When the processor executes the computer program or the instructions, the processor is further configured to implement the foregoing method. For example, the transceiver apparatus may be a transceiver, a transceiver circuit, or an input/output interface. When the communications apparatus is a chip, the transceiver apparatus is a transceiver circuit or an input/output interface.

When the communications apparatus is a chip, a receiving unit may be an input unit, for example, an input circuit or a communications interface; and a sending unit may be an output unit, for example, an output circuit or a communications interface. When the communications apparatus is a terminal device, a receiving unit may be a receiver (which may also be referred to as a receive machine), and a sending unit may be a transmitter (which may also be referred to as a transmit machine).

It may be understood that, in embodiments of this application, hardware parts that are responsible for input and output in the communications apparatus may be integrated.

According to an eleventh aspect, a communications apparatus is provided. The communications apparatus can implement the communications method according to any one of the fourth aspect or the sixth aspect and the implementations. For example, the communications apparatus may be a chip (for example, a baseband chip or a communications chip). The foregoing method may be implemented by software, hardware, or hardware executing corresponding software.

In a possible implementation, a structure of the communications apparatus includes a processor and a memory. The processor is configured to support the apparatus in performing a corresponding function in the foregoing communications method. The memory is configured to be coupled to the processor, and the memory stores a program (instructions) and data necessary for the apparatus. Optionally, the communications apparatus may further include a communications interface, configured to support communication between the apparatus and another network element.

In another possible implementation, the communications apparatus may include a unit or a module for performing a corresponding action in the foregoing method.

In another possible implementation, the communications apparatus includes a processor and a transceiver apparatus. The processor is coupled to the transceiver apparatus, and the processor is configured to execute a computer program or instructions, to control the transceiver apparatus to receive and send information. When the processor executes the computer program or the instructions, the processor is further configured to implement the foregoing method. For example, the transceiver apparatus may be a transceiver, a transceiver circuit, or an input/output interface. When the communications apparatus is a chip, the transceiver apparatus is a transceiver circuit or an input/output interface.

When the communications apparatus is a chip, a receiving unit may be an input unit, for example, an input circuit or a communications interface; and a sending unit may be an output unit, for example, an output circuit or a communications interface. When the communications apparatus is a terminal device, a receiving unit may be a receiver (which may also be referred to as a receive machine), and a sending unit may be a transmitter (which may also be referred to as a transmit machine).

It may be understood that, in embodiments of this application, hardware parts that are responsible for input and output in the communications apparatus may be integrated.

According to a twelfth aspect, a computer-readable storage medium is provided. The computer-readable storage medium stores instructions, and when the instructions are run on a computer, the computer is enabled to perform the method according to any one of the foregoing aspects.

According to a thirteenth aspect, a computer program product including instructions is provided. When the computer program product is run on a computer, the computer is enabled to perform the method according to any one of the foregoing aspects.

According to a fourteenth aspect, a communications system is provided. The communications system includes any one of the foregoing communications apparatuses.

BRIEF DESCRIPTION OF DRAWINGS

To describe the technical solutions in embodiments of this application or in the conventional technology more clearly, the following briefly describes the accompanying drawings required in embodiments.

DESCRIPTION OF EMBODIMENTS

The following describes the technical solutions in embodiments of this application with reference to the accompanying drawings in embodiments of this application.

The following describes a concept of DRX.

DRX means that, in a web browsing scenario, a VOLTE call scenario, or the like, a modem of a terminal device is in a burst working state and a proportion of a working time to a total time is relatively small, so that working and power saving can be well implemented by formulating a burst transceiving mechanism.

A network device may configure a DRX-related parameter for the terminal device by using radio resource control (RRC) signaling.

The following describes several DRX parameters that may be involved in this application.

(1) DRX cycle There are two types of DRX cycles: a long discontinuous reception cycle (drx-long cycle) ("long cycle" for short) and a short discontinuous reception cycle (drx-short cycle) ("short cycle" for short). The long cycle is an integer multiple of the short cycle. If the long cycle is configured for a terminal device, the long cycle is used to monitor and receive data; or if the short cycle and the long cycle are configured for the terminal device, the long cycle and the short cycle are alternately used to monitor and receive data according to a protocol.

Figure 1:
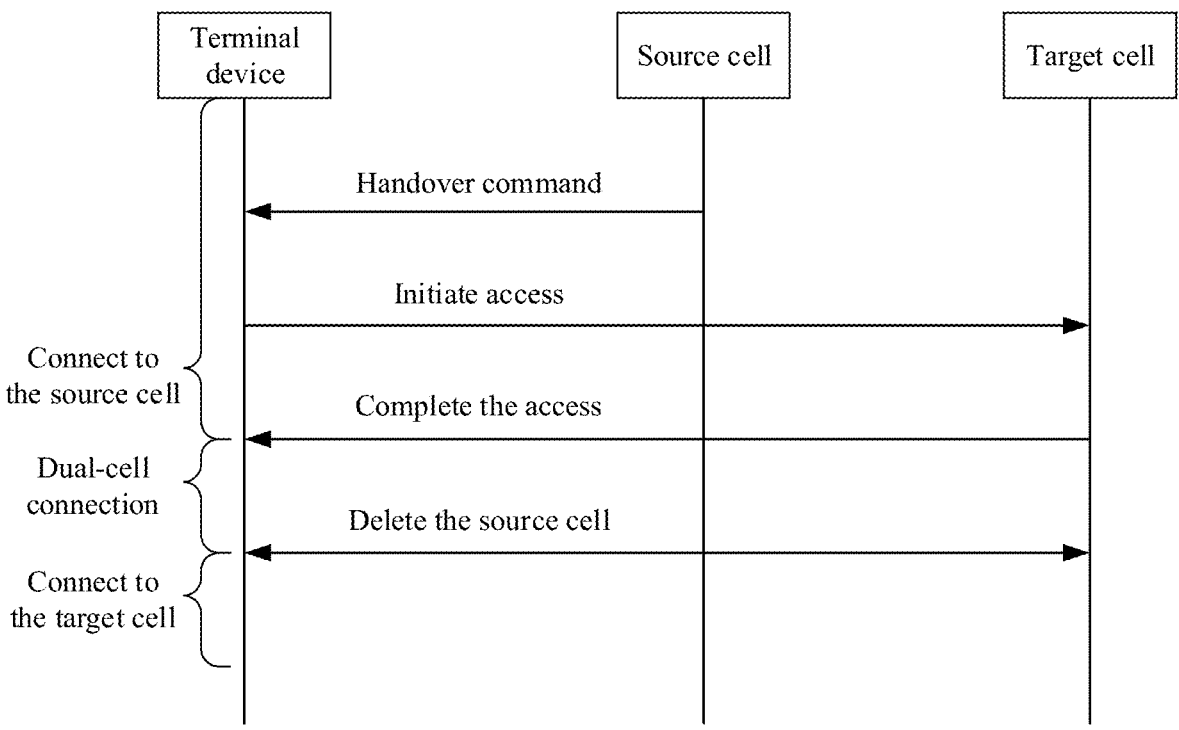
FIG. 1 is a schematic diagram of a DAPS handover procedure.
Figure 2:
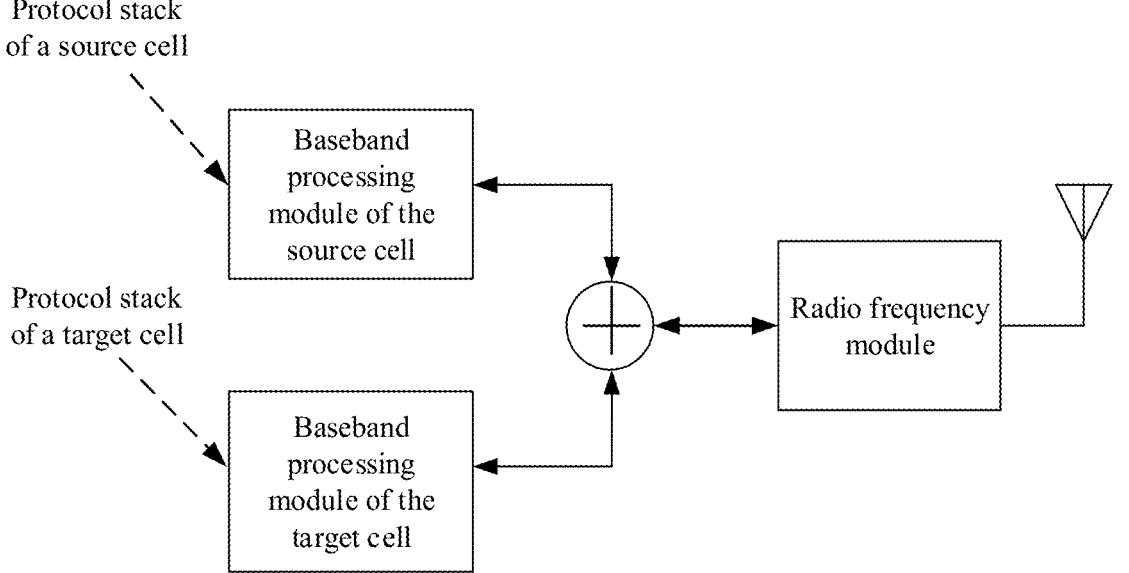
FIG. 2 is a schematic diagram of a structure of radio frequency transceiving and processing of a terminal device.
Figure 3:
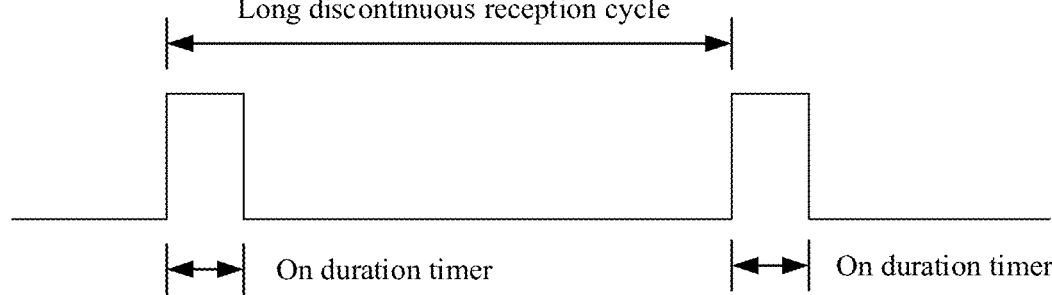
FIG. 3 is a schematic diagram of a DRX working principle.

(2) On duration timer FIG. 3 is a schematic diagram of a DRX working principle. Assuming that a long cycle is configured for a terminal device, the terminal device receives data within duration of the on duration timer, and sleeps beyond the duration of the on duration timer. This can reduce power consumption of the terminal device.

(3) Long discontinuous reception cycle start offset (drx-LongCycleStartOffset): A long cycle and a discontinuous reception start offset (drx-StartOffset) define a subframe on which the long cycle and a short cycle start.

If the short cycle is used, [(SFN×10)+Subframe number] modulo (drx-short cycle)=(drx-StartOffset) modulo (drx-short cycle), where modulo represents a modulo operation.

If the long cycle is used, [(SFN×10)+Subframe number] modulo (drx-long cycle)=(drx-StartOffset) modulo (drx-long cycle).

(4) Discontinuous reception inactivity timer (drx-inactivitytimer): The discontinuous reception inactivity timer means a working time after a physical downlink control channel (PDCCH) is received. The PDCCH indicates new uplink (UL) or downlink (DL) transmission for a media access control (MAC) entity.

Figure 4:
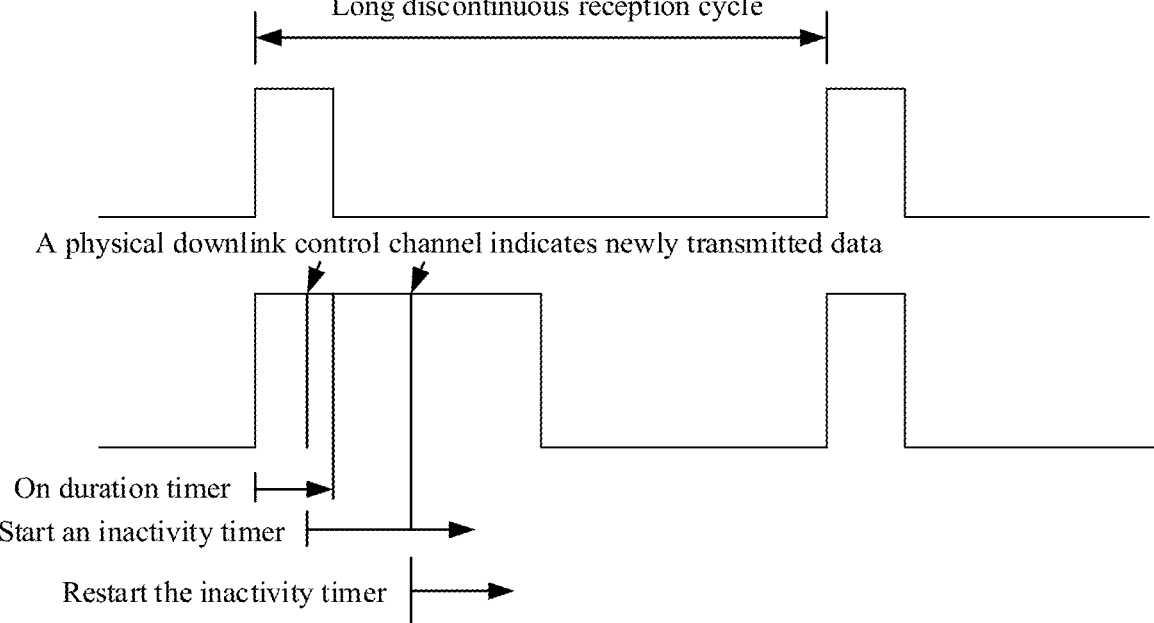
FIG. 4 is a schematic diagram of a DRX working principle for receiving newly transmitted data for a plurality of times.

FIG. 4 is a schematic diagram of a DRX working principle for receiving newly transmitted data for a plurality of times. If a terminal device receives newly transmitted data within a timing time of an on-duration timer, the terminal device starts one drx-inactivitytimer when receiving the newly transmitted data, and a timing time of the drx-inactivitytimer is longer than that of the on-duration timer. When the terminal device receives newly transmitted data again within a timing time of a first drx-inactivitytimer, the terminal device starts another drx-inactivitytimer, until no newly transmitted data is received within a timing time of the drx-inactivitytimer. In this case, a baseband processing module and a radio frequency module of the terminal device enter a sleep state.

Figure 5:
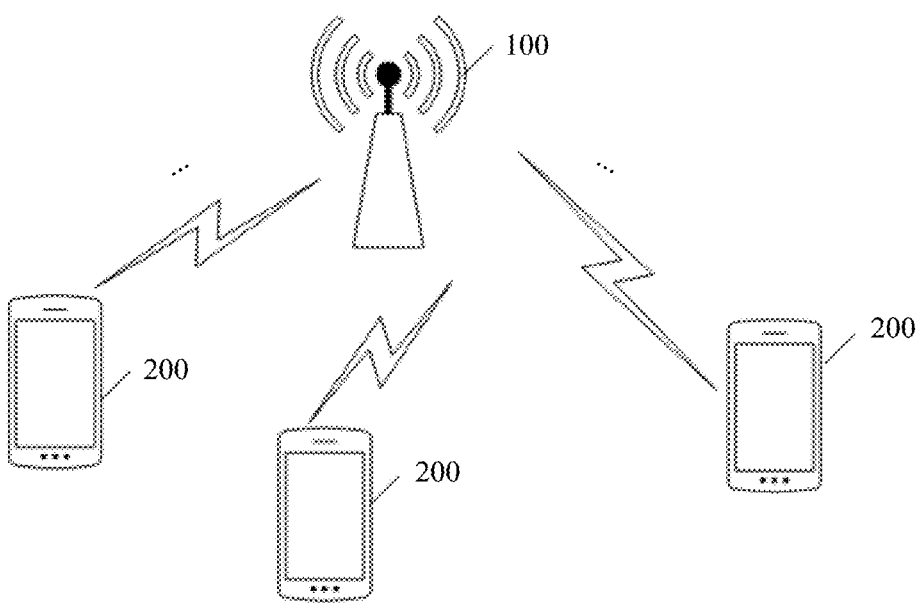
FIG. 5 is a schematic diagram of a structure of a communications system according to an embodiment of this application.

FIG. 5 is a schematic diagram of a communications system according to this application. The communications system may include at least one network device 100 (only one network device 100 is shown) and one or more terminal devices 200 connected to the network device 100.

The network device 100 may be a device that can communicate with the terminal device 200. The network device 100 may be any device having a wireless transceiver function. The network device includes but is not limited to a NodeB, an evolved NodeB eNodeB, a base station in a fifth generation (5G) communications system, a base station or a network device in a future communications system, an access node in a Wi-Fi system, a wireless relay node, a wireless backhaul node, and the like. The network device 100 may alternatively be a radio controller in a cloud radio access network (CRAN) scenario. The network device 100 may alternatively be a small cell, a transmission reception point (TRP), or the like. A specific technology and a specific device form that are used by the network device are not limited in embodiments of this application.

The terminal device 200 is a device having a wireless transceiver function. The terminal device may be deployed on land, including an indoor or outdoor device, a handheld device, a wearable device, or a vehicle-mounted device; or may be deployed on a water surface, for example, on a ship; or may be deployed in the air, for example, on an airplane, a balloon, or a satellite. The terminal device may be a mobile phone, a pad, a computer having a wireless transceiver function, a virtual reality (VR) terminal device, an augmented reality (AR) terminal device, a wireless terminal in industrial control, a wireless terminal in self-driving, a wireless terminal in remote medical, a wireless terminal in a smart grid, a wireless terminal in transportation safety, a wireless terminal in a smart city, a wireless terminal in a smart home, or the like. An application scenario is not limited in embodiments of this application. The terminal device may alternatively be referred to as user equipment (UE), an access terminal device, a UE unit, a mobile station, a mobile console, a remote station, a remote terminal device, a mobile device, a terminal, a wireless communications device, a UE agent, a UE apparatus, or the like.

It should be noted that terms "system" and "network" in embodiments of this application are used interchangeably. In addition, "a plurality of" means two or more. In view of this, "a plurality of" may also be understood as "at least two" in embodiments of this application. A term "and/or" describes an association relationship between associated objects and indicates that three relationships may exist. For example, A and/or B may indicate the following cases: Only A exists, both A and B exist, and only B exists.

An embodiment of this application provides a communications method. After a terminal device receives a cell handover command, when the terminal device is connected to both a source cell and a target cell, the terminal device determines a discontinuous reception DRX configuration solution for the source cell and the target cell. The DRX configuration solution includes any one of the following:

DRX configuration information of the source cell and DRX configuration information of the target cell are independently configured (which may be referred to as an "independent configuration solution");

the DRX configuration information of the source cell is consistent with the DRX configuration information of the target cell (which may be referred to as a "consistent configuration solution");

neither the DRX configuration information of the source cell nor the DRX configuration information of the target cell is configured or is valid (which may be referred to as a "robust configuration solution"); or the DRX configuration information of the source cell remains unchanged and the DRX configuration information of the target cell is not configured (which may be referred to as a "single-cell DRX solution").

In addition, the terminal device exchanges data with the source cell according to the DRX configuration solution for the source cell, and/or exchanges data with the target cell according to the DRX configuration solution for the target cell.

According to the communications method in this embodiment of this application, the consistent configuration solution can prolong a sleep time of a terminal radio frequency device as much as possible in an intra-frequency handover scenario and an intra-band continuous inter-frequency handover scenario, and reduce power consumption of the terminal device; the robust configuration solution can achieve better performance with specific power consumption; and the single-cell solution is a compromise.

The following separately describes the foregoing DRX configuration solutions.

Figure 6:
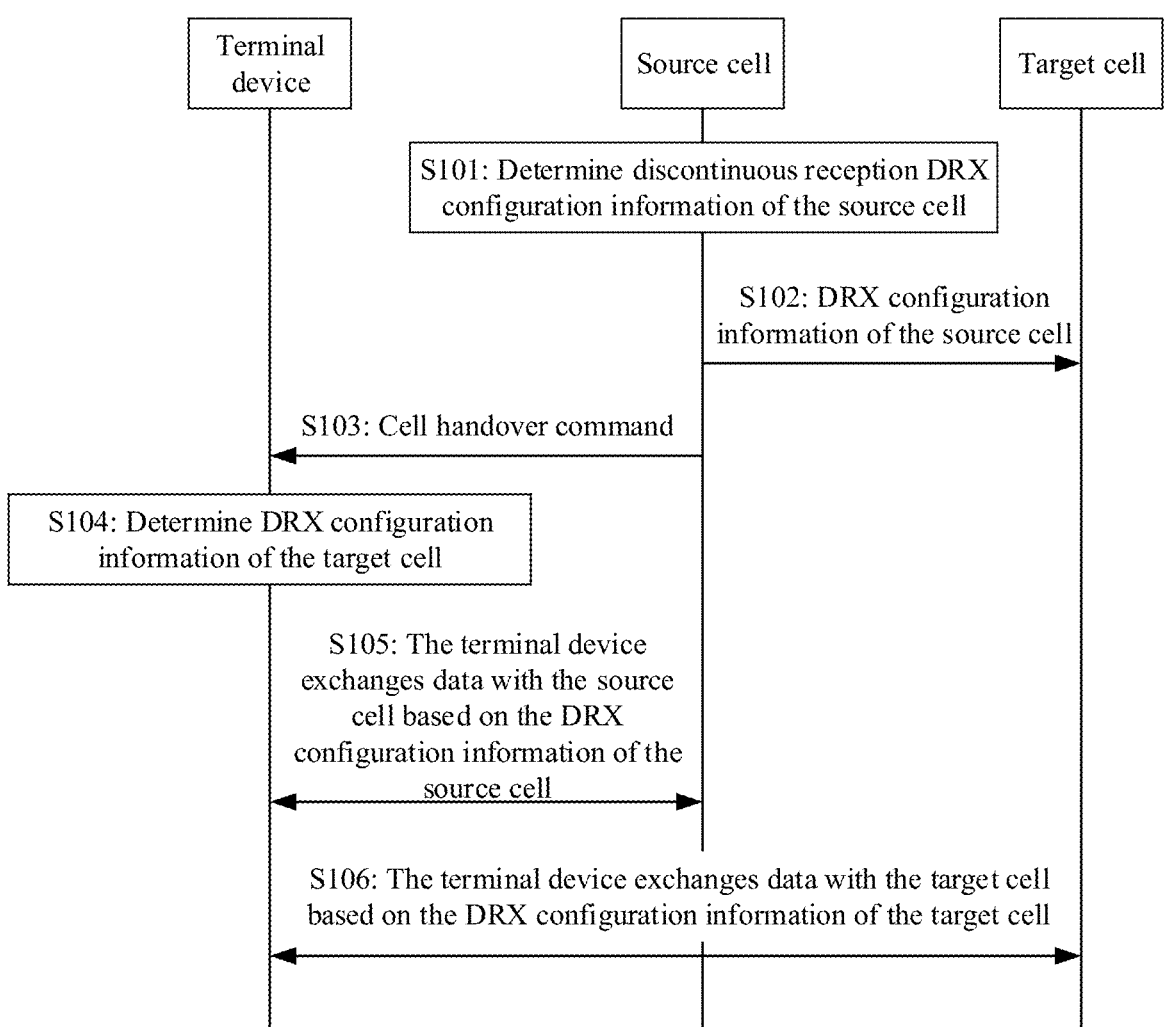
FIG. 6 is a schematic flowchart of a communications method according to an embodiment of this application.

FIG. 6 is a schematic flowchart of a communications method according to an embodiment of this application. The method may include the following operations.

S101: A source cell determines DRX configuration information of the source cell.

Figure 7:
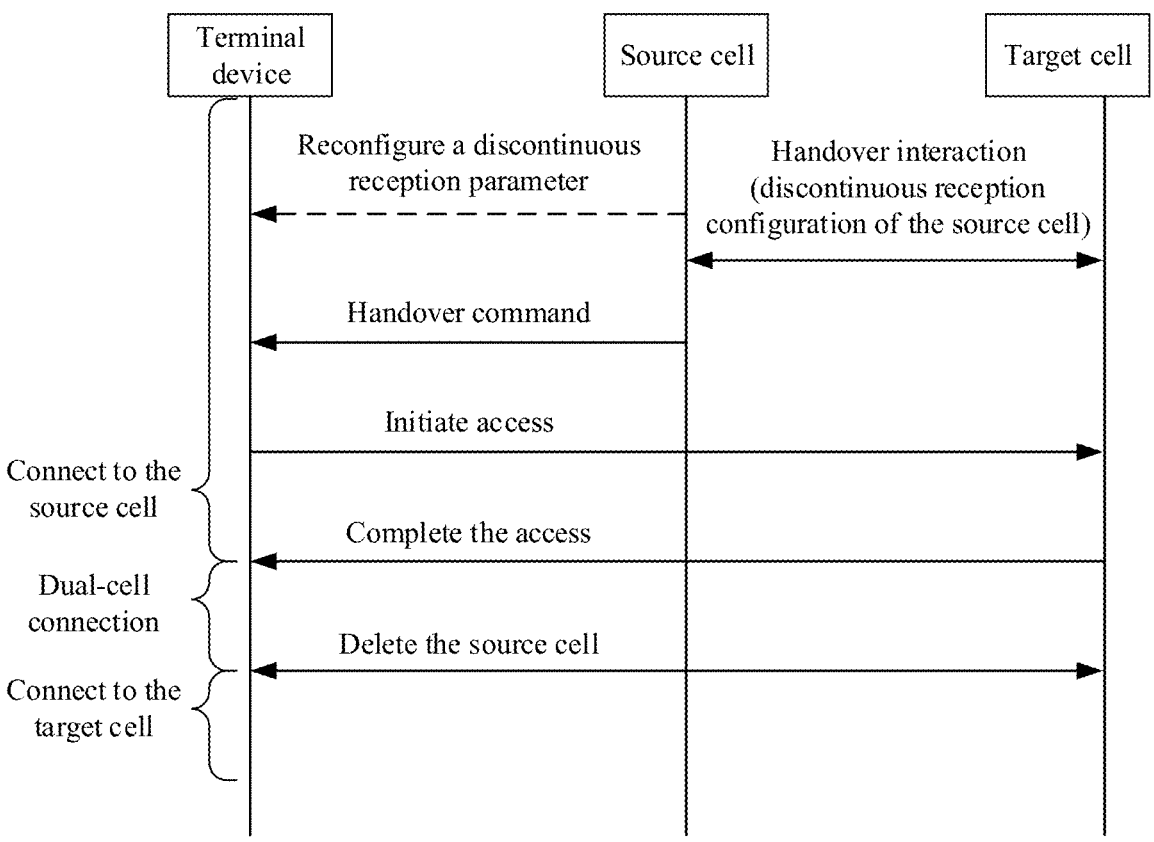
FIG. 7 is a schematic flowchart of a specific example of a communications method.

Specifically, as shown in FIG. 7, after the source cell delivers a handover command, UE initiates HO (using a random access channel) to a target cell. The cell handover may be common handover, or may be conditional handover. The conditional handover means that the UE initiates access when a measurement value of the UE meets a specified condition.

Further, before the source cell initiates handover, if an optional parameter drx-ShortCycle is configured, as shown in FIG. 7, to better adapt to DAPS based handover, DRX reconfiguration may be selected to be performed, and the reconfiguration includes: modifying drx-LongCycle and drx-StartOffset in drx-LongCycleStartOffset, modifying drx-ShortCycle, or deleting drx-ShortCycle.

S102: The source cell sends the DRX configuration information of the source cell to the target cell.

As shown in FIG. 7, before the source cell sends the HO handover command to the UE, the source cell needs to initiate an HO request to the target cell to exchange necessary information of the UE that is required for handover (specifically, the source cell notifies the UE that the UE may need to hand over to the target cell, and the target cell needs to obtain a parameter of the UE from the source cell). The HO request notifies the target cell of a current DRX configuration of the source cell. Alternatively, the target cell may learn of the DRX configuration of the source cell in another possible manner. Correspondingly, the target cell determines discontinuous reception DRX configuration information of the target cell based on the DRX configuration of the source cell. The DRX configuration information of the target cell is consistent with the DRX configuration information of the source cell.

Further, after the UE completes access to the target cell, the target cell may configure a DRX parameter of the target cell in an RRC configuration message or an RRC reconfiguration message.

S103: The source cell sends the cell handover command to the terminal device.

The cell handover command may carry the DRX configuration information of the target cell.

S104: The terminal device determines the DRX configuration information of the target cell, where the DRX configuration information of the target cell is consistent with the DRX configuration information of the source cell.

After receiving the cell handover command, the UE determines the DRX configuration information of the target cell.

That the DRX configuration information of the target cell is consistent with the DRX configuration information of the source cell may be that the DRX configuration information of the target cell is completely consistent with the DRX configuration information of the source cell, or may be that the DRX configuration information of the target cell is quasi-consistent with the DRX configuration information of the source cell. That the DRX configuration information of the target cell is completely consistent or quasi-consistent with the DRX configuration information of the source cell is described in detail below.

Further, for the consistent configuration, the source cell needs to notify the target cell of the DRX configuration parameter of the source cell. If the source cell reconfigures the DRX parameter after the source cell delivers the HO handover command and before the UE connects to the target cell, the source cell also needs to notify the target cell of a new parameter. Alternatively, it is agreed that the source cell does not reconfigure the DRX parameter after the HO handover command is delivered.

S105: The terminal device exchanges data with the source cell based on the DRX configuration information of the source cell.

Before deleting the source cell, the UE exchanges data with the source cell based on the DRX configuration information of the source cell.

After the source cell is deleted and a single-cell connection to the target cell is entered, the DRX configuration information of the source cell is invalid, and the UE deletes the DRX configuration information of the source cell.

S106: The terminal device exchanges data with the target cell based on the DRX configuration information of the target cell.

The UE exchanges data with the target cell based on the DRX configuration information of the target cell that is determined in the foregoing operation.

Specifically, in a dual connection, the UE may exchange data with the target cell based on the DRX configuration information of the target cell that is determined in the foregoing operation.

After deleting the source cell and entering the single-cell connection to the target cell, the UE may still exchange data with the target cell based on the DRX configuration information of the target cell that is determined in the foregoing operation; or the UE may receive DRX configuration information reconfigured by the target cell, and exchange data with the target cell based on the DRX configuration information reconfigured by the target cell.

In an intra-freq scenario and an intra-band continuous scenario, one radio frequency module receives and sends signals of both the source cell and the target cell. The consistent configuration solution can ensure that the target cell and the source cell have a same sleep cycle in a synchronous scenario, and maximize a sleep time of the radio frequency module.

According to the communications method provided in this embodiment of this application, after receiving the cell handover command, the terminal device determines the discontinuous reception DRX configuration information of the source cell and the DRX configuration information of the target cell. The DRX configuration information of the target cell is consistent with the DRX configuration information of the source cell. The terminal device exchanges data with the source cell based on the DRX configuration information of the source cell, and/or exchanges data with the target cell based on the DRX configuration information of the target cell. The terminal device receives data of the target cell by using a same DRX configuration as the source cell. This can prolong a sleep time of the terminal device as much as possible, and reduce power consumption of the terminal device.

That the DRX configuration information of the target cell is completely consistent or quasi-consistent with the DRX configuration information of the source cell is described in detail below.

A meaning of "consistent" is as follows: In the consistent solution, parameters such as drx-LongCycleStartOffset (including drx-LongCycle and drx-StartOffset) and drx-ShortCycle (optional) are consistent or quasi-consistent, and other parameters impose relatively small impact and may be not limited.

(1) Completely consistent: Parameters such as drx-LongCycleStartOffset (including drx-LongCycle and drx-StartOffset) and drx-ShortCycle (optional) of the target cell are consistent with those of the source cell.

(2) Quasi-consistent: Minimum DRX configuration cycles of the target cell and the source cell are equal, and parameters drx-StartOffset are aligned.

To be specific, that the DRX configuration information of the target cell is consistent with the DRX configuration information of the source cell includes:

when the DRX configuration information of the source cell includes the long cycle parameter and the short cycle parameter, the long cycle parameter of the target cell is the same as the long cycle parameter of the source cell, and the short cycle parameter of the target cell is the same as the short cycle parameter of the source cell; or when the DRX configuration information of the source cell includes the short cycle parameter, and the DRX configuration information of the target cell does not include the short cycle parameter, the long cycle parameter of the target cell is the same as the short cycle parameter of the source cell, or the long cycle parameter of the target cell is an integer multiple of the short cycle parameter of the source cell, or the short cycle parameter of the source cell is an integer multiple of the long cycle parameter of the target cell; or when the DRX configuration information of the source cell includes the short cycle parameter, and the DRX configuration information of the target cell includes the short cycle parameter, the short cycle parameter of the target cell is the same as the short cycle parameter of the source cell, or the short cycle parameter of the target cell is an integer multiple of the short cycle parameter of the source cell, or the short cycle parameter of the source cell is an integer multiple of the short cycle parameter of the target cell; or when the DRX configuration information of the source cell includes the long cycle parameter, and the DRX configuration information of the target cell does not include the short cycle parameter, the long cycle parameter of the target cell is the same as the long cycle parameter of the source cell, or the long cycle parameter of the target cell is an integer multiple of the long cycle parameter of the source cell, or the long cycle parameter of the source cell is an integer multiple of the long cycle parameter of the target cell; or when the DRX configuration information of the source cell includes the long cycle parameter, and the DRX configuration information of the target cell includes the short cycle parameter, the short cycle parameter of the target cell is the same as the long cycle parameter of the source cell, or the short cycle parameter of the target cell is an integer multiple of the long cycle parameter of the source cell, or the long cycle parameter of the source cell is an integer multiple of the short cycle parameter of the target cell.

Specifically, for the quasi-consistent solution, there are two cases in which the minimum DRX configuration cycles of the target cell and the source cell are consistent.

Case 1: It is assumed that the source cell configures drx-ShortCycle; drx-ShortCycle and drx-LongCycle of the source cell are respectively X and MX (M is an integer); and drx-StartOffset is Y, where a value of Y ranges from 0 to MX−1 (Long is an integer multiple of Short according to a protocol), and X and MX need to be optional values in the protocol. In this case, in an implementation, if the target cell does not configure drx-ShortCycle, drx-LongCycle of the target cell is X; drx-StartOffset is Z; and Z=Y modulo X.

In another implementation, if the target cell configures drx-ShortCycle, drx-ShortCycle of the target cell is X; drx-LongCycle is NX (N is an integer); drx-StartOffset is Z, where a value of Z ranges from 0 to NX−1; and Z modulo X=Y modulo X.

Case 2: It is assumed that the source cell does not configure drx-ShortCycle; drx-LongCycle of the source cell is X; and drx-StartOffset is Y, where a value of Y ranges from 0 to X−1, and X needs to be an optional value in the protocol. In this case, in an implementation, if the target cell does not configure drx-ShortCycle, drx-LongCycle of the target cell is X; and drx-StartOffset is Y.

In another implementation, if the target cell configures drx-ShortCycle, drx-ShortCycle of the target cell is X; drx-LongCycle is NX (N is an integer); drx-StartOffset is Z, where a value of Z ranges from 0 to NX−1; and Z modulo X=Y.

For the quasi-consistent solution, there are also two cases in which the minimum DRX configuration cycles of the target cell and the source cell are in an integer multiple relationship.

Case 1: It is assumed that the source cell configures drx-ShortCycle; drx-ShortCycle and drx-LongCycle of the source cell are respectively X and MX (M is an integer); and drx-StartOffset is Y, where a value of Y ranges from 0 to MX−1, and X and MX need to be optional values in the protocol. In this case, in an implementation, if the target cell also configures drx-ShortCycle, drx-ShortCycle of the target cell is an integer multiple or an integer division of X (assuming that a value is P); drx-LongCycle is NP (N is an integer); drx-StartOffset is Z, where a value of Z ranges from 0 to NP−1; and Y modulo min (X, P)=Z modulo min (X, P), where P and NP need to be optional values in the protocol, and modulo represents a modulo operation.

For example, drx-ShortCycle and drx-LongCycle of the source cell are respectively 16 and 64; and drx-StartOffset is 63.

An optional value of drx-ShortCycle of the target cell is 2, 4, 8, 16, 32, 64, 128, 256, or 512, for example, 8. In this case, an optional value of drx-LongCycle is 32, 64, 128, or the like, for example, 32. In addition, drx-StartOffset Z needs to meet: Z modulo min (8, 16)=63 modulo min (8, 16)=7, where Z is optionally 7, 15, or 31.

In another implementation, if the target cell does not configure drx-ShortCycle, drx-LongCycle of the target cell is an integer multiple or an integer division of X (assuming that a value is P); drx-StartOffset is Z, where a value of Z ranges from 0 to P−1; and Z modulo min (X, P)=Y modulo min (X, P), where P needs to be an optional value in the protocol.

For example, drx-ShortCycle and drx-LongCycle of the source cell are respectively 16 and 64; and drx-StartOffset is 63.

An optional value of drx-LongCycle of the target cell is 32, 64, 128, 256, 512, 1024, or 2048, for example, 32; and drx-StartOffset Z needs to meet: Z modulo min (32, 16)=63 modulo min (32, 16)=15, where Z is optionally 15 or 31.

Case 2: It is assumed that the source cell does not configure drx-ShortCycle; drx-LongCycle of the source cell is X; and drx-StartOffset is Y, where a value of Y ranges from 0 to X−1, and X needs to be an optional value in the protocol. In this case, in an implementation, if the target cell configures drx-ShortCycle, drx-ShortCycle of the target cell is an integer multiple or an integer division of X (assuming that a value is P); drx-LongCycle is NP (N is an integer); drx-StartOffset is Z, where a value of Z ranges from 0 to NP−1; and Z modulo min (X, P)=Y modulo min (X, P), where P and NP need to be optional values in the protocol.

For example, drx-LongCycle of the source cell is 20; and drx-StartOffset is 19.

An optional value of drx-ShortCycle of the target cell is 10, 20, 40, or the like, for example, 10. In this case, an optional value of drx-LongCycle is 20, 40, 60, or the like, for example, 40. In addition, drx-StartOffset Z needs to meet: Z modulo min (10, 20)=19 modulo min (10, 20)=9, where Z is optionally 9, 19, 29, or 39.

In another implementation, if the target cell does not configure drx-ShortCycle, drx-LongCycle of the target cell is an integer multiple or an integer division of X (assuming that a value is P); drx-StartOffset is Z, where a value of Z ranges from 0 to P−1; and Y modulo min (X, P)=Z modulo min (X, P), where P needs to be an optional value in the protocol.

For example, drx-LongCycle of the source cell is 20; and drx-StartOffset is 19.

An optional value of drx-LongCycle of the target cell is 10, 20, 40, 80, or the like, for example, 40; and drx-StartOffset Z needs to meet: Z modulo min (20, 40)=19 modulo min (20, 40)=19, where Z is optionally 19 or 39.

Figure 8:
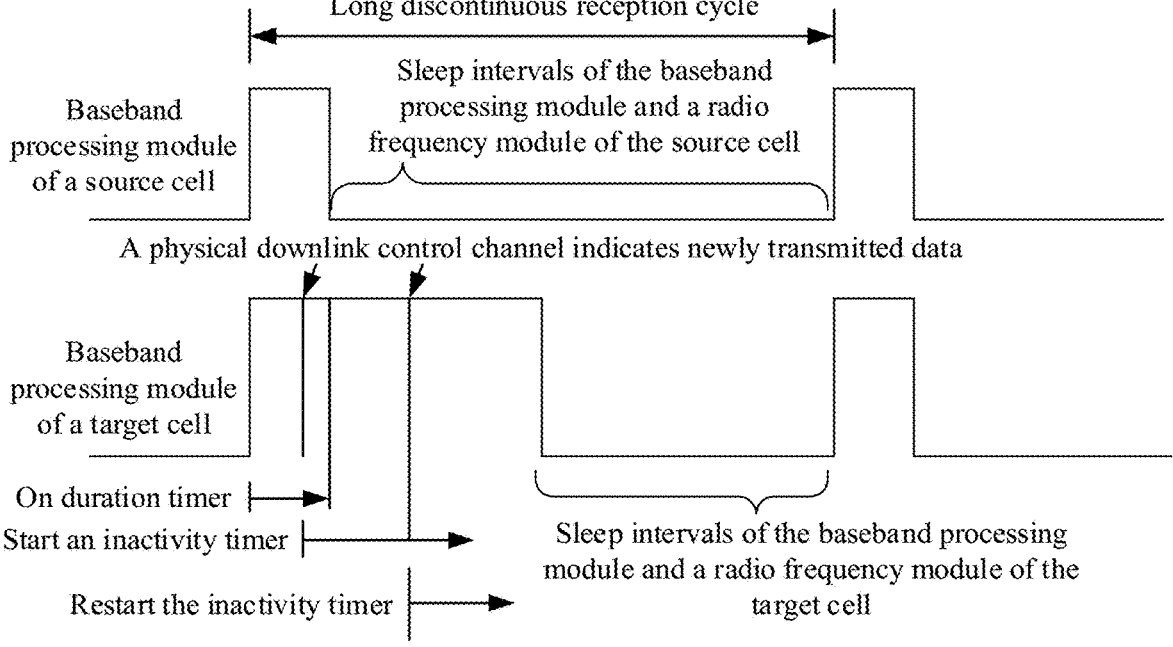
FIG. 8 is a schematic diagram of communicating with a source cell and a target cell by using completely consistent DRX configurations.
Figure 9:
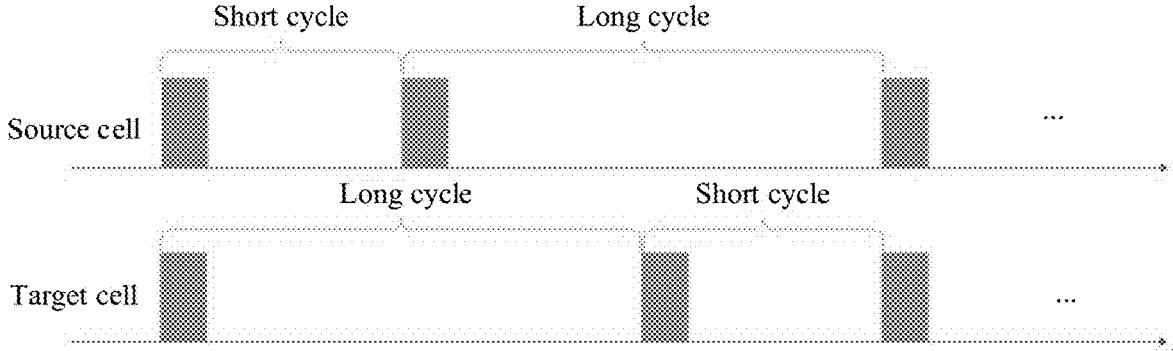
FIG. 9 is a schematic diagram of communicating with a source cell and a target cell by using completely quasi-consistent DRX configurations.

After the UE determines that the DRX configuration information of the target cell is consistent or quasi-consistent with the DRX configuration of the source cell, FIG. 8 and FIG. 9 show schematic diagrams in which the UE receives data of the source cell and the target cell by using a DRX mechanism. Specifically, in FIG. 8, the UE determines that the DRX configuration information of the target cell is consistent with the DRX configuration of the source cell. Specifically, the parameters drx-LongCycle and drx-StartOffset are consistent. In this case, sleep intervals of baseband processing modules and radio frequency modules of the target cell and the source cell may be consistent as much as possible. This reduces power consumption of the UE as much as possible. As shown in FIG. 9, the UE determines that the DRX configuration information of the target cell is quasi-consistent with the DRX configuration of the source cell, and minimum DRX configuration cycles of the target cell and the source cell are equal. In this case, sleep intervals of baseband processing modules and radio frequency modules of the target cell and the source cell may be consistent as much as possible. This reduces power consumption of the UE as much as possible.

Further, in some embodiments, if the DRX parameter is reconfigured after the source cell sends HO handover command signaling and before the UE connects to the target cell, the target cell needs to be notified, so that the target cell performs "consistent or quasi-consistent" DRX configuration.

In some embodiments, it is agreed that the DRX parameter is not reconfigured after the source cell sends HO handover command signaling.

In some embodiments, after the UE initiates HO to the target cell, the target cell performs DRX configuration that is "consistent or quasi-consistent" with that of the source cell.

In some embodiments, the target cell does not need to configure the DRX parameter of the target cell, and it may be agreed that the target cell uses a same DRX configuration as the source cell.

In this case, if the target cell performs different DRX configuration, the UE directly discards the configuration and uses the DRX configuration of the source cell.

Alternatively, if the target cell performs different DRX configuration, any DRX configuration of the target cell is not enabled, and the DRX configuration of the target cell is enabled until the DRX configurations of the source cell and the source cell are deleted.

Alternatively, if the target cell performs different DRX configuration, the UE uses the DRX configuration of the target cell, and it is considered that the source cell also changes the DRX configuration accordingly.

Alternatively, if the target cell performs different DRX configuration, the UE uses the configuration.

In the dual connection, if either of the source cell and the target cell reconfigures the DRX parameter, it is considered by default that both the cells change the DRX configurations accordingly.

Alternatively, in the dual connection, if either of the source cell and the target cell reconfigures the DRX parameter, the UE directly discards the configuration.

Alternatively, in the dual connection, if either of the source cell and the target cell reconfigures the DRX parameter, the UE uses the configuration on the cell.

In some embodiments, if an HO failure occurs in the target cell and no DRX configuration is valid in the target cell, no consistent configuration is involved.

If a radio link failure (RLF) occurs in the source cell in the dual connection, the DRX configuration of the target cell continues to be valid, and the DRX configuration of the source cell automatically becomes invalid.

If an RLF occurs in the target cell in the dual connection, the DRX configuration of the target cell automatically becomes invalid, and the DRX configuration of the source cell remains valid.

If an RLF occurs in the target cell in the dual connection and the UE continues to initiate new DAPS HO, a related procedure of the DRX configuration is still followed in a new target cell.

Figure 10:
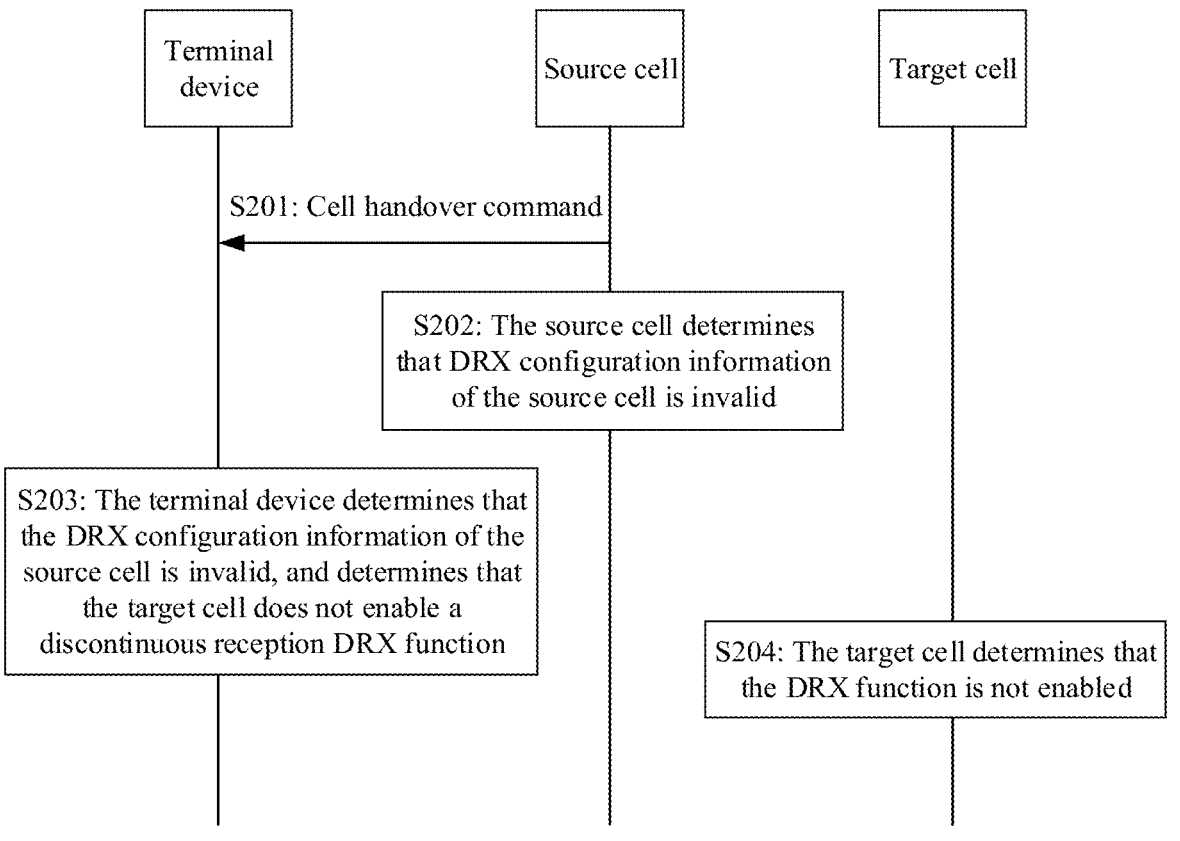
FIG. 10 is a schematic flowchart of another communications method according to an embodiment of this application.

FIG. 10 is a schematic flowchart of another communications method according to an embodiment of this application. The method may include the following operations.

S201: A source cell sends a cell handover command to a terminal device.

Correspondingly, the terminal device receives the cell handover command.

S202: The source cell determines that DRX configuration information of the source cell is invalid.

It may be understood that there is no sequence of performing S201 and S202. In an implementation, before sending the HO handover command to the UE, the source cell may send a reconfiguration message to the UE. The reconfiguration message is used to indicate to delete or skip enabling a DRX configuration of the source cell. In this case, the UE deletes the DRX configuration information of the source cell, or disables the DRX configuration of the source cell.

In another implementation, after sending the HO handover command to the UE, the source cell may alternatively delete the DRX configuration of the source cell by using the reconfiguration message. In this case, the UE deletes the DRX configuration information of the source cell.

In another implementation, after the source cell sends the HO handover command to the UE, it may be agreed that the DRX configuration of the source cell automatically becomes invalid.

S203: The terminal device determines that the DRX configuration information of the source cell is invalid, and determines that a target cell does not enable a discontinuous reception DRX function.

Before or after receiving the HO handover command of the source cell, the UE may determine, by using the reconfiguration message of the source cell, that the DRX configuration information of the source cell is invalid. In addition, the UE determines that the target cell does not enable the DRX function.

An occasion in which the source cell sends the reconfiguration message to the UE may be that the source cell receives a notification message from the target cell after the UE hands over to the target cell. The notification message is used to notify the source cell that the UE has initiated a connection to the target cell. In this case, the source cell sends the reconfiguration message to the UE.

Specifically, the target cell may notify the UE by using the notification message in the following scenarios:

In an implementation, if the source cell configures UE contention-free random access in the HO handover command, the target cell receives a random access preamble sent by the UE. In addition, after delivering a message 2 (msg2) to the UE, the target cell notifies the source cell that the UE has initiated HO. In this case, the source cell sends the reconfiguration message to the UE, to indicate the UE to delete the DRX configuration of the source cell. After receiving the reconfiguration message, the UE deletes the DRX configuration of the source cell.

Alternatively, if the source cell configures UE contention-free random access in the HO handover command, the target cell receives a preamble sent by the UE. In addition, after the target cell delivers msg2 to the UE, the target cell notifies the source cell that the UE has initiated HO, and it is agreed that the source cell does not enable the DRX configuration. After receiving msg2, the UE automatically deletes the DRX configuration of the source cell.

Alternatively, if the source cell configures UE contention-free random access in the HO handover command, the target cell receives a preamble sent by the UE. In addition, after the target cell delivers msg2 to the UE, the target cell notifies the source cell that the UE has initiated HO, and it is agreed that the source cell does not enable the DRX configuration. After receiving msg2, the UE automatically deletes the DRX configuration of the source cell after X ms (considering a delay for the target cell to notify the source cell), where X is greater than or equal to 0.

Alternatively, if the source cell configures UE contention random access in the HO handover command, the UE can initiate random access in a 2-operation or 4-operation random access mode. In addition, after the target cell completes contention resolution (receiving msg4 ack), the target cell notifies the source cell that the UE has initiated HO, and the source cell sends the reconfiguration message to the UE, to indicate the UE to delete the DRX configuration. After receiving the reconfiguration message, the UE deletes the DRX configuration of the source cell.

Alternatively, if the source cell configures contention random access, the UE can initiate random access in a 2-operation or 4-operation random access mode. In addition, after the target cell completes contention resolution (receiving msg4 ack), the target cell notifies the source cell that the UE has initiated HO, and it is agreed that the source cell does not enable the DRX configuration. After correctly demodulating msg4, the UE may automatically delete the DRX configuration of the source cell.

Alternatively, if the source cell configures contention random access, the UE can initiate random access in a 2-operation or 4-operation random access mode. In addition, after the target cell completes contention resolution (receiving msg4 ack), the target cell notifies the source cell that the UE has initiated HO, and it is agreed that the source cell does not enable the DRX configuration. After correctly demodulating msg4, the UE may automatically delete the DRX configuration of the source cell after a delay of X ms (considering a delay for the target cell to notify the source cell).

Further, if a connection to the source cell becomes poor in a dual connection or even an RLF occurs, if the UE does not receive a reconfiguration message for DRX deletion after the source cell delivers the reconfiguration message, and if the RLF occurs in the source cell, and the DRX configuration of the source cell automatically becomes invalid, no additional impact is imposed.

If a connection to the source cell becomes poor in a dual connection or even an RLF occurs, after the UE receives a reconfiguration message for DRX deletion and executes the reconfiguration message after the source cell delivers the reconfiguration message, if the RLF occurs in the source cell, in other words, the RLF occurs after the DRX configuration of the source cell is invalid, no additional impact is imposed.

If an RLF occurs in the target cell in a dual connection and no DRX configuration is valid in the target cell that an RLF occurs in the target cell imposes no additional impact on the DRX.

If an RLF occurs in the target cell in a dual connection and the UE re-initiates DAPS HO, a related procedure of the DRX configuration is still followed in a new target cell.

S204: The target cell determines that the DRX function is not enabled.

Specifically, in an implementation, it may be agreed that, when the target cell receives an access request initiated by the UE, the target cell determines that the DRX function of the target cell is disabled.

In another implementation, when the target cell receives handover interaction signaling sent by the source cell, the target cell determines that the DRX function of the target cell is disabled.

According to the communications method provided in this embodiment of this application, after receiving the cell handover command, the terminal device determines that the DRX configuration information of the source cell is invalid, and determines that the target cell disables the DRX function. This improves cell handover reliability.

Figure 11:
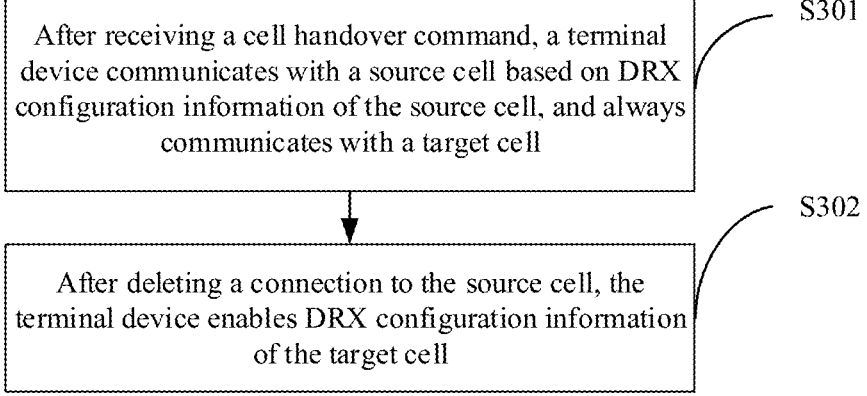
FIG. 11 is a schematic flowchart of another communications method according to an embodiment of this application.

FIG. 11 is a schematic flowchart of another communications method according to an embodiment of this application. The method may include the following operations.

S301: After receiving a cell handover command, a terminal device communicates with a source cell based on DRX configuration information of the source cell, and always communicates with a target cell.

After receiving the handover command, the terminal device communicates with the source cell based on DRX configuration information of the source cell that is previously configured by the source cell. The target cell does not enable a DRX function of the target cell, and the UE determines that the target cell does not enable the DRX function of the target cell. In other words, the terminal device does not receive data of the target cell by using a DRX mechanism, but always communicates with the target cell. This ensures cell handover reliability.

In an implementation, it may be agreed that, in a dual connection, the UE does not enable a DRX configuration of the target cell.

In another implementation, in a dual connection, if the target cell configures a DRX parameter of the target cell for the terminal device, the UE does not enable a DRX configuration of the target cell.

S302: After deleting a connection to the source cell, the terminal device enables DRX configuration information of the target cell.

In other words, after the UE deletes the connection to the source cell and enters a single-target-cell scenario, if the target cell configures the DRX parameter in the dual connection, the UE enables the DRX parameter of the target cell.

An alternative manner of S302 is: After the terminal device deletes the connection to the source cell, if the target cell configures no DRX parameter in the dual connection, the UE does not enable any DRX parameter of the target cell until the UE receives the DRX configuration information of the target cell.

Another alternative manner of S302 is: After the terminal device deletes the connection to the source cell, if the target cell configures no DRX parameter in the dual connection, the UE enables a DRX parameter of the source cell as the DRX parameter of the target cell.

Further, in an implementation, if a radio link failure occurs in the source cell before the UE accesses the target cell, the DRX configuration of the source cell automatically becomes invalid, and the target cell continues to skip enabling any DRX configuration until the target cell configures the DRX parameter.

In another implementation, if a radio link failure occurs in the source cell after the UE initiates access to the target cell, the DRX configuration of the source cell automatically becomes invalid. After successfully accessing the target cell, the UE directly uses the DRX configuration of the source cell to communicate with the target cell.

In another implementation, if a radio link failure occurs in the source cell before the UE accesses the target cell, the UE directly accesses the target cell. After successfully accessing the target cell, the UE directly uses the DRX configuration of the source cell.

In another implementation, if a radio link failure occurs in the source cell before the UE accesses the target cell, the UE directly accesses the target cell. After successfully accessing the target cell, the UE does not enable any DRX configuration until the UE receives the DRX configuration of the target cell.

In another implementation, if a radio link failure occurs in the target cell in the dual connection, the target cell configures no DRX parameter, and no additional impact is imposed.

In another implementation, if a radio link failure occurs in the target cell in the dual-connection and if the UE re-initiates DAPS HO, a related procedure of the DRX configuration is still followed in a new target cell.

According to the communications method provided in this embodiment of this application, after receiving the cell handover command, the terminal device may communicate with the source cell by using the DRX configuration of the source cell, and may not enable the DRX function of the target cell. This improves cell handover reliability.

The foregoing describes the method embodiments of this application, and the following describes the apparatuses in this application.

Figure 12:
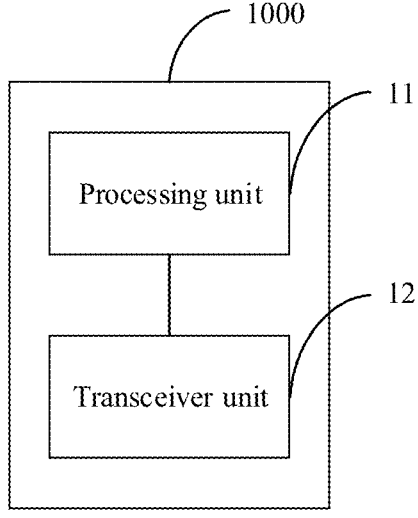
FIG. 12 is a schematic diagram of a structure of a communications apparatus according to an embodiment of this application.

Based on a same concept as the foregoing communications method, an embodiment of this application further provides a communications apparatus. FIG. 12 is a schematic diagram of a structure of a communications apparatus according to an embodiment of this application. The apparatus 1000 includes a processing unit 11 and a transceiver unit 12.

The processing unit 11 is configured to: after a cell handover command is received, determine DRX configuration information of a target cell, where the DRX configuration information of the target cell is consistent with DRX configuration information of a source cell.

The transceiver unit 12 is configured to: exchange data with the source cell based on the DRX configuration information of the source cell, and/or exchange data with the target cell based on the DRX configuration information of the target cell.

In an implementation, the processing unit 11 is configured to: when a radio link failure occurs in the target cell, determine that the DRX configuration information of the target cell is invalid; and the processing unit 11 is further configured to delete the DRX configuration information of the target cell.

In another implementation, the processing unit 11 is configured to: when a radio link failure occurs in the source cell, determine that the DRX configuration information of the source cell is invalid; and the transceiver unit 12 is configured to initiate access to the target cell or maintain a connection to the target cell.

In another implementation, the processing unit 11 is configured to determine that the DRX configuration information of the source cell does not include a short DRX cycle parameter; or the transceiver unit 12 is configured to receive a reconfiguration message from the source cell, where the reconfiguration message is used to indicate to delete a short DRX cycle parameter in the DRX configuration information of the source cell, and/or reconfigure the short DRX cycle parameter in the DRX configuration information of the source cell, and/or modify a long DRX cycle parameter in the DRX configuration information of the source cell.

For specific implementation of the processing unit 11 and the transceiver unit 12, refer to the descriptions of the terminal device in the method embodiment shown in FIG. 6.

According to the communications apparatus provided in this embodiment of this application, after receiving the cell handover command, the terminal device determines the discontinuous reception DRX configuration information of the source cell and the DRX configuration information of the target cell. The DRX configuration information of the target cell is consistent with the DRX configuration information of the source cell. The terminal device exchanges data with the source cell based on the DRX configuration information of the source cell, and/or exchanges data with the target cell based on the DRX configuration information of the target cell. The terminal device receives data of the target cell by using a same DRX configuration as the source cell. This can prolong a sleep time of the terminal device as much as possible, and reduce power consumption of the terminal device.

Figure 13:
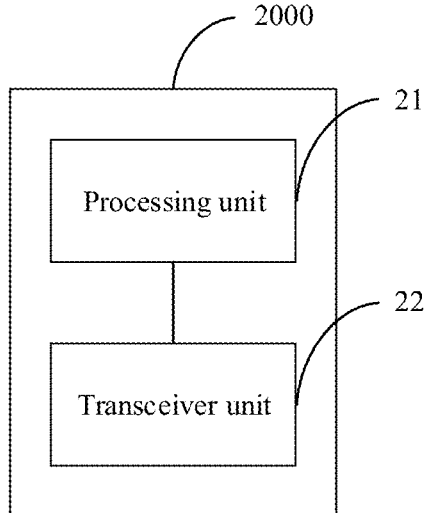
FIG. 13 is a schematic diagram of a structure of another communications apparatus according to an embodiment of this application.

Based on a same concept as the foregoing communications method, an embodiment of this application further provides a communications apparatus. FIG. 13 is a schematic diagram of a structure of a communications apparatus according to an embodiment of this application. The communications apparatus 2000 includes a processing unit 21 and a transceiver unit 22. The processing unit 21 is configured to determine discontinuous reception DRX configuration information of a target cell, where the DRX configuration information of the target cell is consistent with DRX configuration information of a source cell.

The transceiver unit 22 is configured to exchange data with a terminal device based on the DRX configuration information of the target cell.

In an implementation, the transceiver unit 22 is configured to receive a handover request from the source cell, where the handover request includes the DRX configuration information of the source cell.

For specific implementation of the processing unit 21 and the transceiver unit 22, refer to the descriptions of the target cell in the method embodiment shown in FIG. 6.

According to the communications apparatus provided in this embodiment of this application, the apparatus determines that the DRX configuration information of the target cell is consistent with the DRX configuration information of the source cell; and exchanges data with the terminal device based on the DRX configuration information of the target cell. This ensures successful handover.

Figure 14:
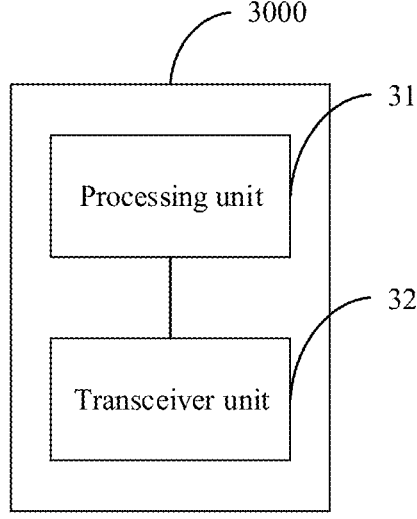
FIG. 14 is a schematic diagram of a structure of another communications apparatus according to an embodiment of this application.

Based on a same concept as the foregoing communications method, an embodiment of this application further provides a communications apparatus. FIG. 14 is a schematic diagram of a structure of a communications apparatus according to an embodiment of this application. The apparatus 3000 includes a processing unit 31 and a transceiver unit 32. The processing unit 31 is configured to determine discontinuous reception DRX configuration information of a source cell.

The transceiver unit 32 is configured to send the DRX configuration information of the source cell to a target cell.

In an implementation, the processing unit 31 is configured to determine that the DRX configuration information of the source cell does not include a short DRX cycle parameter; or the transceiver unit 32 is configured to send a reconfiguration message to a terminal device, where the reconfiguration message is used to indicate the terminal device to delete a short DRX cycle parameter in the DRX configuration information of the source cell, and/or modify a long DRX cycle parameter in the DRX configuration information of the source cell.

For specific implementation of the processing unit 31 and the transceiver unit 32, refer to the descriptions of the source cell in the method embodiment shown in FIG. 6.

According to the communications apparatus provided in this embodiment of this application, the apparatus sends the DRX configuration information of the source cell the target cell, so that the DRX configuration information of the target cell is consistent with the DRX configuration information of the source cell; and exchanges data with the terminal device based on the DRX configuration information of the source cell. This ensures communication with the source cell during handover.

Figure 15:
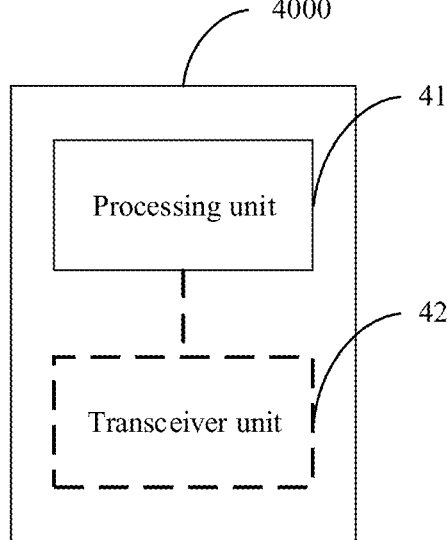
FIG. 15 is a schematic diagram of a structure of another communications apparatus according to an embodiment of this application.

Based on a same concept as the foregoing communications method, an embodiment of this application further provides a communications apparatus. FIG. 15 is a schematic diagram of a structure of a communications apparatus according to an embodiment of this application. The apparatus 4000 includes a processing unit 41, and may further include a transceiver unit 42. The processing unit 41 is configured to: after a cell handover command is received, determine that discontinuous reception DRX configuration information of a source cell is invalid, and determine that a target cell does not enable a discontinuous reception DRX function.

In an implementation, the transceiver unit 42 is configured to receive a reconfiguration message from the source cell, where the reconfiguration message is used to indicate to delete the discontinuous reception DRX configuration information of the source cell.

The processing unit 41 is configured to delete the DRX configuration information of the source cell.

For specific implementation of the processing unit 41 and the transceiver unit 42, refer to the descriptions of the terminal device in the method embodiment shown in FIG. 10.

According to the communications apparatus provided in this embodiment of this application, after receiving the cell handover command, the terminal device determines that the DRX configuration information of the source cell is invalid, and determines that the target cell does not enable the DRX function. This improves cell handover reliability.

Figures 16, 17:
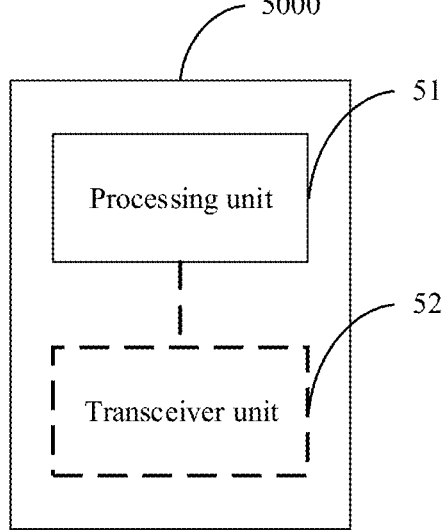
FIG. 16 is a schematic diagram of a structure of another communications apparatus according to an embodiment of this application.
FIG. 17 is a schematic diagram of a structure of another communications apparatus according to an embodiment of this application.

Based on a same concept as the foregoing communications method, an embodiment of this application further provides a communications apparatus. FIG. 16 is a schematic diagram of a structure of a communications apparatus according to an embodiment of this application. The apparatus 5000 includes a processing unit 51, and may further include a transceiver unit 52. The processing unit 51 is configured to: after a terminal device receives a cell handover command, determine that discontinuous reception DRX configuration information of a source cell is invalid.

In an implementation, the transceiver unit 52 is configured to: after the terminal device hands over to a target cell, receive a notification message from the target cell, where the notification message is used to notify the source cell that the terminal device has initiated a connection to the target cell.

The transceiver unit 52 is further configured to send a reconfiguration message to the terminal device, where the reconfiguration message is used to indicate to delete the DRX configuration information of the source cell.

For specific implementation of the processing unit 51 and the transceiver unit 52, refer to the descriptions of the source cell in the method embodiment shown in FIG. 10.

According to the communications apparatus provided in this embodiment of this application, after the terminal device receives the cell handover command, the apparatus determines that the DRX configuration information of the source cell is invalid. This improves handover reliability.

Based on a same concept as the foregoing communications method, an embodiment of this application further provides a communications apparatus. FIG. 17 is a schematic diagram of a structure of a communications apparatus according to an embodiment of this application. The apparatus 6000 includes a processing unit 61.

The processing unit 61 is configured to determine that a target cell does not enable a discontinuous reception DRX function.

For specific implementation of the processing unit 61, refer to the descriptions of the target cell in the method embodiment shown in FIG. 10.

According to the communications apparatus provided in this embodiment of this application, after a terminal device receives a cell handover command, the apparatus determines that the target cell disables the DRX function of the target cell. This improves cell handover reliability.

Figure 18:
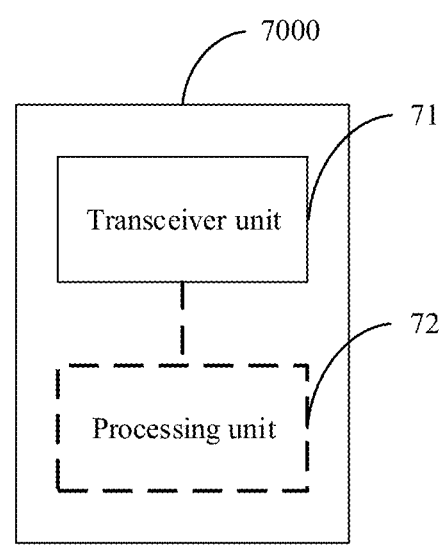
FIG. 18 is a schematic diagram of a structure of another communications apparatus according to an embodiment of this application.

Based on a same concept as the foregoing communications method, an embodiment of this application further provides a communications apparatus. FIG. 18 is a schematic diagram of a structure of a communications apparatus according to an embodiment of this application. The communications apparatus 7000 includes a transceiver unit 71, and may further include a processing unit 72. The transceiver unit 71 is configured to: after a cell handover command is received, communicate with a source cell based on discontinuous reception DRX configuration information of the source cell, and always communicate with a target cell.

In an implementation, the processing unit 72 is configured to: when connections to both the source cell and the target cell are established, skip enabling DRX configuration information of the target cell.

In another implementation, the processing unit 72 is further configured to: after the connection to the source cell is deleted, enable the DRX configuration information of the target cell.

Alternatively, the transceiver unit 71 is further configured to: after the connection to the source cell is deleted, receive the DRX configuration information of the target cell.

For specific implementation of the transceiver unit 71 and the processing unit 72, refer to the descriptions of the method embodiment shown in FIG. 11.

According to the communications apparatus provided in this embodiment of this application, after receiving a cell handover command, the terminal device may communicate with the source cell by using the DRX configuration of the source cell, and may not enable a DRX function of the target cell. This improves cell handover reliability.

An embodiment of this application further provides a terminal device/network device. The terminal device/network device is configured to perform the foregoing communications methods. Some or all of the foregoing communications methods may be implemented by hardware, or may be implemented by software.

Optionally, the terminal device/network device may be a chip or an integrated circuit during specific implementation.

Optionally, when some or all of the communications methods in embodiments are implemented by using software, the terminal device/network device includes a processor, configured to execute a program. When the program is executed, the terminal device/network device is enabled to implement the communications methods provided in embodiments. The terminal device/network device may further include a memory, configured to store a necessary program. The program may be loaded into the memory when the terminal device/network device is delivered from a factory, or may be loaded into the memory when needed later.

Optionally, the memory may be a physically independent unit, or may be integrated with the processor.

Optionally, when some or all of the communications methods in embodiments are implemented by using software, the terminal device/network device may alternatively include only a processor. The memory configured to store the program is located outside the terminal device/network device, and the processor is connected to the memory through a circuit/cable, to read and execute the program stored in the memory.

The processor may be a central processing unit (CPU), a network processor (NP), or a combination of the CPU and the NP.

Optionally, the processor may include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The memory may include a volatile memory, for example, a random access memory (RAM). The memory may alternatively include a nonvolatile memory, for example, a flash memory, a hard disk drive (HDD), or a solid state drive (SSD). The memory may alternatively include a combination of the foregoing types of memories.

Figure 19:
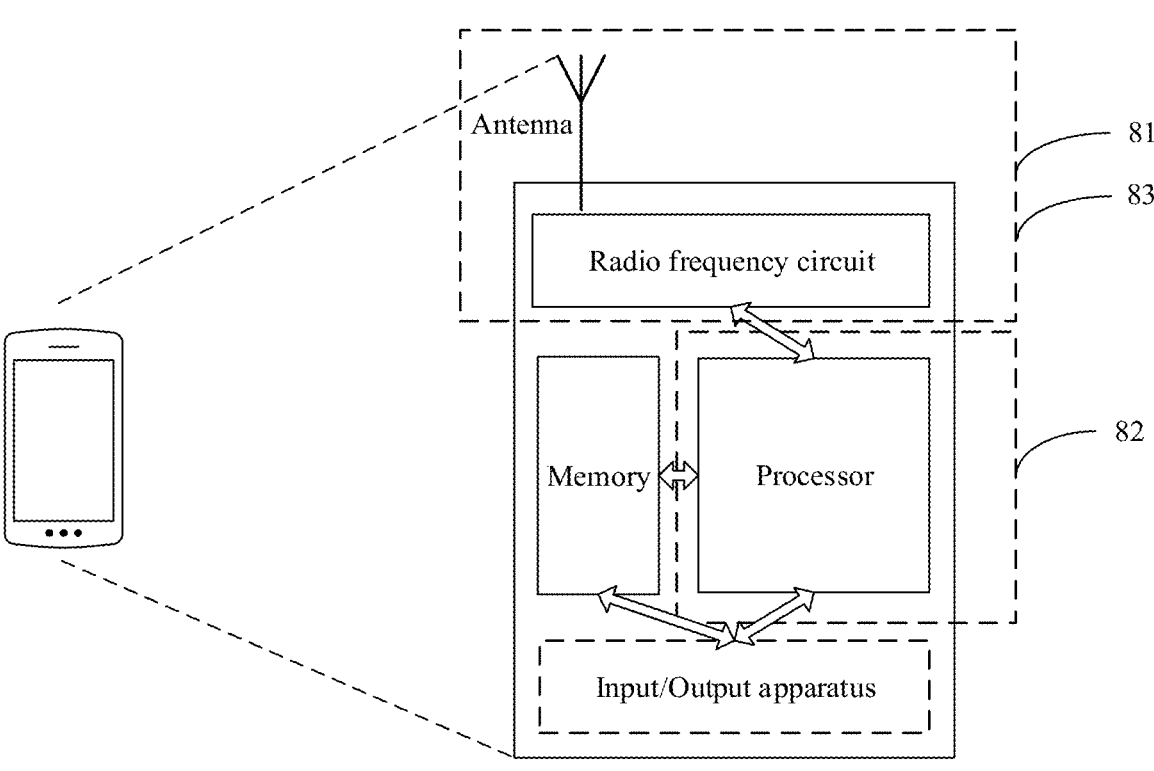
FIG. 19 is a schematic diagram of a structure of a simplified terminal device according to an embodiment of this application.

FIG. 19 is a schematic diagram of a structure of a simplified terminal device. For ease of understanding and illustration, an example in which a terminal device is a mobile phone is used in FIG. 19. As shown in FIG. 19, the terminal device includes a processor, and may further include a radio frequency circuit, an antenna, and an input/output apparatus. For example, the processor may be configured to: process a communications protocol and communications data, and may be further configured to: control the terminal device, execute a software program, and process data of the software program. The terminal device may further include a memory. The memory is mainly configured to store the software programs and data. The program may be loaded into the memory when the communications apparatus is delivered from a factory, or may be loaded into the memory when needed later. The radio frequency circuit is mainly configured to: perform conversion between a baseband signal and a radio frequency signal, and process the radio frequency signal. The antenna is mainly configured to send and receive a radio frequency signal in a form of an electromagnetic wave. The input/output apparatus, for example, a touchscreen, a display, or a keyboard, is mainly configured to: receive data entered by a user, and output data to the user. It should be noted that some types of terminal devices may have no input/output apparatus.

When data needs to be sent, the processor performs baseband processing on the to-be-sent data, and outputs the baseband signal to the radio frequency circuit. The radio frequency circuit performs radio frequency processing on the baseband signal and then sends the radio frequency signal to the outside through the antenna in a form of an electromagnetic wave. When data is sent to the terminal device, the radio frequency circuit receives the radio frequency signal through the antenna, converts the radio frequency signal into a baseband signal, and outputs the baseband signal to the processor. The processor converts the baseband signal into data and processes the data. For ease of description, only one memory and one processor are shown in FIG. 19. An actual terminal device product may include one or more processors and one or more memories. The memory may also be referred to as a storage medium, a storage device, or the like. The memory may be disposed independently of the processor, or may be integrated with the processor. This is not limited in this embodiment of this application.

In this embodiment of this application, the antenna and the radio frequency circuit having a transceiver function may be considered as a receiving unit and a sending unit (which may also be collectively referred to as a transceiver unit) of the terminal device, and the processor having a processing function may be considered as a processing unit of the terminal device. As shown in FIG. 19, the terminal device includes a receiving unit 81, a processing unit 82, and a sending unit 83. The receiving unit 81 may also be referred to as a receiver, a receive machine, a receiver circuit, or the like. The sending unit 83 may also be referred to as a sender, a transmitter, a transmit machine, a transmitter circuit, or the like. The processing unit may also be referred to as a processor, a processing board, a processing module, a processing apparatus, or the like.

For example, in an embodiment, the receiving unit 81 is configured to perform the functions of the terminal device in operations S103, S105, and S106 in the embodiment shown in FIG. 6; the processing unit 82 is configured to perform operation S104 in the embodiment shown in FIG. 6; and the sending unit 83 is configured to perform the functions of the terminal device in operations S105 and S106 in the embodiment shown in FIG. 6.

For example, in another embodiment, the receiving unit 81 is configured to perform the function of the terminal device in operation S201 in the embodiment shown in FIG. 10; and the processing unit 82 is configured to perform operation S203 in the embodiment shown in FIG. 10.

For example, in another embodiment, the sending unit 83 is configured to perform operations S301 and S302 in the embodiment shown in FIG. 11.

Figure 20:
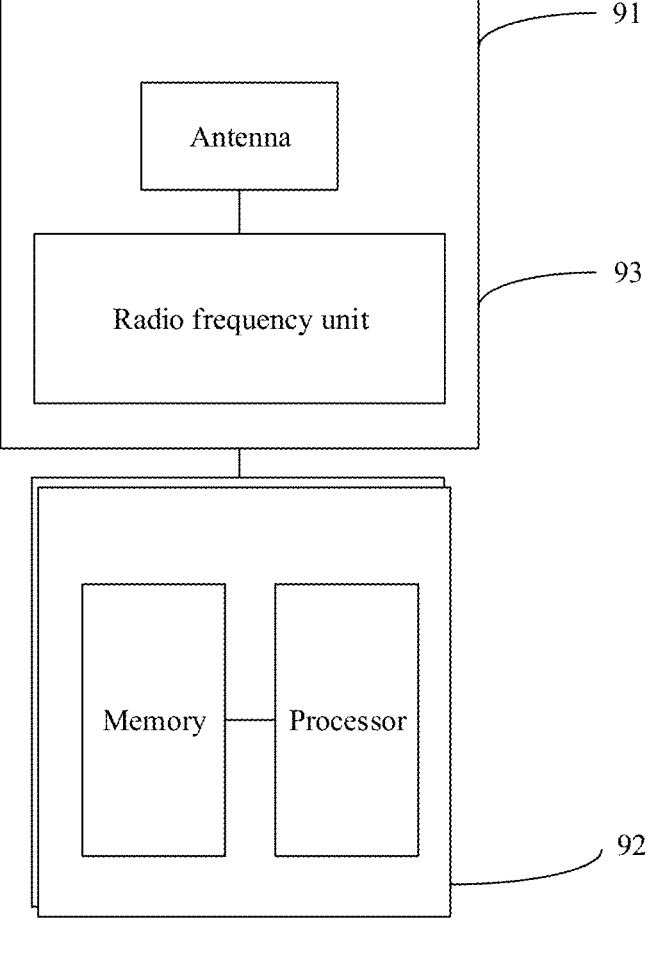
FIG. 20 is a schematic diagram of a structure of a simplified network device according to an embodiment of this application.

FIG. 20 is a schematic diagram of a structure of a simplified network device. The network device includes a part 92 and a part for radio frequency signal transceiving and conversion. The part for radio frequency signal transceiving and conversion further includes a receiving unit 91 and a sending unit 93 (which may also be collectively referred to as a transceiver unit). The part for radio frequency signal transceiving and conversion is mainly configured to: send and receive a radio frequency signal, and perform conversion between a radio frequency signal and a baseband signal. The part 92 is mainly configured to: perform baseband processing, control the network device, and the like. The receiving unit 91 may also be referred to as a receiver, a receive machine, a receiver circuit, or the like. The sending unit 93 may also be referred to as a sender, a transmitter, a transmit machine, a transmitter circuit, or the like. The part 92 is usually a control center of the network device, and may be usually referred to as a processing unit, configured to control the network device to perform the operations performed by the source cell and the target cell in FIG. 6, FIG. 10, and FIG. 11. For details, refer to the foregoing descriptions of the related parts.

The part 92 may include one or more boards. Each board may include one or more processors and one or more memories. The processor is configured to read and execute a program in the memory, to implement a baseband processing function and control the network device. If there are a plurality of boards, the boards may be connected to each other to improve a processing capability. In an optional implementation, a plurality of boards may share one or more processors, or a plurality of boards share one or more memories.

For example, in an embodiment, the part 92 is configured to perform the function of S101 in the embodiment shown in FIG. 6; the receiving unit 91 is configured to perform the functions of the source cell in S105 and S106 in the embodiment shown in FIG. 6; and the sending unit 93 is configured to perform the functions of the source cell in S103, S105, and S106 in the embodiment shown in FIG. 6.

For example, in another embodiment, the receiving unit 91 is configured to perform the functions of the target cell in S102 and S106 in the embodiment shown in FIG. 6; and the sending unit 93 is configured to perform the function of the target cell in S106 in the embodiment shown in FIG. 6.

For example, in another embodiment, the sending unit 93 is configured to perform the function of the source cell in operation S201 in the embodiment shown in FIG. 10; and the part 92 is configured to perform operation S202 in the embodiment shown in FIG. 10.

For example, in another embodiment, the part 92 is configured to perform operation S204 in the embodiment shown in FIG. 10.

A person skilled in the art may clearly understand that, for convenient and brief description, for detailed working processes of the foregoing system, apparatus, and unit, refer to corresponding processes in the foregoing method embodiments. Details are not described herein again.

In several embodiments provided in this application, it should be understood that the disclosed system, apparatus, and method may be implemented in another manner. For example, unit division is merely logical function division and may be other division during actual implementation. For example, a plurality of units or components may be combined or integrated into another system, or some features may be ignored or not performed. The displayed or discussed mutual couplings or direct couplings or communications connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one position, or may be distributed on a plurality of network units. Some or all of the units may be selected according to actual requirements to achieve the objectives of the solutions of embodiments.

All or some of embodiments may be implemented by using software, hardware, firmware, or any combination thereof. When the software is used to implement embodiments, all or some of embodiments may be implemented in a form of a computer program product. The computer program product includes one or more computer instructions. When the computer program instructions are loaded and executed on a computer, procedures or functions according to embodiments of this application are all or partially generated. The computer may be a general-purpose computer, a special-purpose computer, a computer network, or another programmable apparatus. The computer instructions may be stored in a computer-readable storage medium, or transmitted by using the computer-readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a read-only memory (ROM), a random access memory (RAM), or a magnetic medium, for example, a floppy disk, a hard disk, a magnetic tape, a magnetic disk, or an optical medium, for example, a digital versatile disc (DVD), or a semiconductor medium, for example, a solid state drive (SSD).

What is claimed is:

1. A communications method, wherein the method comprises:

prior to initiating handover, determining that a short discontinuous reception (DRX) cycle parameter is absent from DRX configuration information of a source cell or receiving, from the source cell, a reconfiguration message indicating to delete the short DRX cycle parameter in the DRX configuration information of the source cell, wherein the determining or receiving is performed to adapt DRX configuration for dual active protocol stack (DAPS)-based handover;

determining DRX configuration information of a target cell in response to receiving a cell handover command, wherein the DRX configuration information of the target cell is consistent with DRX configuration information of a source cell to enable synchronized sleep intervals between the source cell and the target cell during dual connectivity;

exchanging data with at least one of the source cell based on the DRX configuration information of the source cell or the target cell based on the DRX configuration information of the target cell while maintaining connections to both the source cell and the target cell;

determining that the DRX configuration information of the target cell is invalid when a radio link failure occurs in the target cell; and deleting the DRX configuration information of the target cell.

2. The method according to claim 1, wherein the method further comprises:

determining that the DRX configuration information of the source cell is invalid when a radio link failure occurs in the source cell; and in response to determining that the DRX configuration information of the source cell is invalid:

initiating access to the target cell; or maintaining a connection to the target cell.

3. The method according to claim 1, wherein the reconfiguration message further indicates to modify a long DRX cycle parameter in the DRX configuration information of the source cell.

4. The method according to claim 1, wherein the DRX configuration information of the target cell is consistent with the DRX configuration information of the source cell under at least one of the following conditions:

when the DRX configuration information of the source cell comprises a long cycle parameter and a short cycle parameter, a long cycle parameter of the target cell is the same as a long cycle parameter of the source cell, and a short cycle parameter of the target cell is the same as a short cycle parameter of the source cell;

when the DRX configuration information of the source cell comprises the short cycle parameter and the DRX configuration information of the target cell does not comprise the short cycle parameter, the long cycle parameter of the target cell is the same as the short cycle parameter of the source cell, or the long cycle parameter of the target cell is an integer multiple of the short cycle parameter of the source cell, or the short cycle parameter of the source cell is an integer multiple of the long cycle parameter of the target cell;

when the DRX configuration information of the source cell comprises the short cycle parameter and the DRX configuration information of the target cell comprises the short cycle parameter, the short cycle parameter of the target cell is the same as the short cycle parameter of the source cell, or the short cycle parameter of the target cell is an integer multiple of the short cycle parameter of the source cell, or the short cycle parameter of the source cell is an integer multiple of the short cycle parameter of the target cell;

when the DRX configuration information of the source cell comprises the long cycle parameter and the DRX configuration information of the target cell does not comprise the short cycle parameter, the long cycle parameter of the target cell is the same as the long cycle parameter of the source cell, or the long cycle parameter of the target cell is an integer multiple of the long cycle parameter of the source cell, or the long cycle parameter of the source cell is an integer multiple of the long cycle parameter of the target cell; or when the DRX configuration information of the source cell comprises the long cycle parameter and the DRX configuration information of the target cell comprises the short cycle parameter, the short cycle parameter of the target cell is the same as the long cycle parameter of the source cell, or the short cycle parameter of the target cell is an integer multiple of the long cycle parameter of the source cell, or the long cycle parameter of the source cell is an integer multiple of the short cycle parameter of the target cell.

5. A communications apparatus, wherein the apparatus comprises:
   at least one processor;
   a memory storing programming instructions for execution by the at least one processor and cause the at least one processor to:
   prior to initiating handover, determine that a short discontinuous reception (DRX) cycle parameter is absent from DRX configuration information of a source cell or receiving, from the source cell, a reconfiguration message indicating to delete the short DRX cycle parameter in the DRX configuration information of the source cell, wherein the determining or receiving is performed to adapt DRX configuration for dual active protocol stack (DAPS)-based handover;
   determine DRX configuration information of a target cell in response to receiving a cell handover command, wherein the DRX configuration information of the target cell is consistent with DRX configuration information of a source cell to enable synchronized sleep intervals between the source cell and the target cell during dual connectivity;
   exchange data with at least one of the source cell based on the DRX configuration information of the source cell or the target cell based on the DRX configuration information of the target cell while maintaining connections to both the source cell and the target cell;

determine that the DRX configuration information of the target cell is invalid when a radio link failure occurs in the target cell; and
delete the DRX configuration information of the target cell.

6. The apparatus according to claim 5, wherein
the programming instructions further causes the at least one processor to determine that the DRX configuration information of the source cell is invalid when a radio link failure occurs in the source cell; and
in response to determining that the DRX configuration information of the source is invalid, the programming instructions cause the at least on processor to:
initiate access to the target cell; or
maintain a connection to the target cell.

7. The apparatus according to claim 5, wherein the programming instructions further cause the at least one processor to:
   wherein the reconfiguration message further indicates to modify a long DRX cycle parameter in the DRX configuration information of the source cell.

8. The apparatus according to claim 5, wherein the DRX configuration information of the target cell is consistent with the DRX configuration information of the source cell under at least one of the following conditions:
   when the DRX configuration information of the source cell comprises a long cycle parameter and a short cycle parameter, a long cycle parameter of the target cell is the same as a long cycle parameter of the source cell, and a short cycle parameter of the target cell is the same as a short cycle parameter of the source cell;
   when the DRX configuration information of the source cell comprises the short cycle parameter and the DRX configuration information of the target cell does not comprise the short cycle parameter, the long cycle parameter of the target cell is the same as the short cycle parameter of the source cell, or the long cycle parameter of the target cell is an integer multiple of the short cycle parameter of the source cell, or the short cycle parameter of the source cell is an integer multiple of the long cycle parameter of the target cell;
   when the DRX configuration information of the source cell comprises the short cycle parameter and the DRX configuration information of the target cell comprises the short cycle parameter, the short cycle parameter of the target cell is the same as the short cycle parameter of the source cell, or the short cycle parameter of the target cell is an integer multiple of the short cycle parameter of the source cell, or the short cycle parameter of the source cell is an integer multiple of the short cycle parameter of the target cell;
   when the DRX configuration information of the source cell comprises the long cycle parameter and the DRX configuration information of the target cell does not comprise the short cycle parameter, the long cycle parameter of the target cell is the same as the long cycle parameter of the source cell, or the long cycle parameter of the target cell is an integer multiple of the long cycle parameter of the source cell, or the long cycle parameter of the source cell is an integer multiple of the long cycle parameter of the target cell; or
   when the DRX configuration information of the source cell comprises the short cycle parameter and the DRX configuration information of the target cell comprises the short cycle parameter, the short cycle parameter of the target cell is the same as the long cycle parameter of the source cell, or the short cycle parameter of the target cell is an integer multiple of the long cycle parameter of the source cell, or the long cycle parameter of the source cell is an integer multiple of the short cycle parameter of the target cell.

9. A non-transitory computer readable medium storing one or more programming instructions executable by at least one processor to cause to cause the at least one processor to:

prior to initiating handover, determine that a short discontinuous reception (DRX) cycle parameter is absent from DRX configuration information of a source cell or receive, from the source cell, a reconfiguration message indicating to delete the short DRX cycle parameter in the DRX configuration information of the source cell, wherein the determining or receiving is performed to adapt DRX configuration for dual active protocol stack (DAPS)-based handover;

determine DRX configuration information of a target cell in response to receiving a cell handover command, wherein the DRX configuration information of the target cell is consistent with DRX configuration information of a source cell to enable synchronized sleep intervals between the source cell and the target cell during dual connectivity;

exchange data with at least one of the source cell based on the DRX configuration information of the source cell or the target cell based on the DRX configuration information of the target cell while maintaining connections to both the source cell and the target cell;

determine that the DRX configuration information of the target cell is invalid when a radio link failure occurs in the target cell; and delete the DRX configuration information of the target cell.

10. The non-transitory computer readable medium according to claim 9, wherein the programming instructions further causes the at least one processor to determine that the DRX configuration information of the source cell is invalid when a radio link failure occurs in the source cell; and in response to determining that the DRX configuration information of the source is invalid, the programming instructions cause the at least on processor to:

initiate access to the target cell; or maintain a connection to the target cell.

11. The non-transitory computer readable medium according to claim 9, wherein the programming instructions further cause the at least one processor to:

wherein the reconfiguration message further indicates to modify a long DRX cycle parameter in the DRX configuration information of the source cell.

12. The non-transitory computer readable medium according to claim 9, wherein the DRX configuration information of the target cell is consistent with the DRX configuration information of the source cell under at least one of the following conditions:

when the DRX configuration information of the source cell comprises a long cycle parameter and a short cycle parameter, a long cycle parameter of the target cell is the same as a long cycle parameter of the source cell, and a short cycle parameter of the target cell is the same as a short cycle parameter of the source cell;

when the DRX configuration information of the source cell comprises the short cycle parameter and the DRX configuration information of the target cell does not comprise the short cycle parameter, the long cycle parameter of the target cell is the same as the short cycle parameter of the source cell, or the long cycle parameter of the target cell is an integer multiple of the short cycle parameter of the source cell, or the short cycle parameter of the source cell is an integer multiple of the long cycle parameter of the target cell;

when the DRX configuration information of the source cell comprises the short cycle parameter and the DRX configuration information of the target cell comprises the short cycle parameter, the short cycle parameter of the target cell is the same as the short cycle parameter of the source cell, or the short cycle parameter of the target cell is an integer multiple of the short cycle parameter of the source cell, or the short cycle parameter of the source cell is an integer multiple of the short cycle parameter of the target cell;

when the DRX configuration information of the source cell comprises the long cycle parameter and the DRX configuration information of the target cell does not comprise the short cycle parameter, the long cycle parameter of the target cell is the same as the long cycle parameter of the source cell, or the long cycle parameter of the target cell is an integer multiple of the long cycle parameter of the source cell, or the long cycle parameter of the source cell is an integer multiple of the long cycle parameter of the target cell; or when the DRX configuration information of the source cell comprises the short cycle parameter and the DRX configuration information of the target cell comprises the short cycle parameter, the short cycle parameter of the target cell is the same as the long cycle parameter of the source cell, or the short cycle parameter of the target cell is an integer multiple of the long cycle parameter of the source cell, or the long cycle parameter of the source cell is an integer multiple of the short cycle parameter of the target cell.

* * * * *